United States Patent
Linn et al.

(10) Patent No.: US 10,621,189 B2
(45) Date of Patent: Apr. 14, 2020

(54) IN-APPLICATION HISTORY SEARCH

(71) Applicant: Apple Inc., Cupertino, CA (US)

(72) Inventors: Christopher Scott Linn, Palo Alto, CA (US); John M. Hörnkvist, Cupertino, CA (US); Steven Jon Falkenburg, Los Altos, CA (US); Vipul Ved Prakash, San Francisco, CA (US); David Salim, Milpitas, CA (US); Keith Stattenfield, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 14/871,900

(22) Filed: Sep. 30, 2015

(65) Prior Publication Data

US 2016/0357831 A1    Dec. 8, 2016

Related U.S. Application Data

(60) Provisional application No. 62/171,982, filed on Jun. 5, 2015.

(51) Int. Cl.
*G06F 16/00* (2019.01)
*G06F 16/248* (2019.01)
*G06F 16/22* (2019.01)
*G06F 16/2455* (2019.01)
*G06F 16/9535* (2019.01)

(52) U.S. Cl.
CPC ............ *G06F 16/248* (2019.01); *G06F 16/22* (2019.01); *G06F 16/2228* (2019.01); *G06F 16/2455* (2019.01); *G06F 16/9535* (2019.01)

(58) Field of Classification Search
CPC ......... G06F 17/30867; G06F 17/30312; G06F 16/22; G06F 16/2228; G06F 16/2455; G06F 16/9535; H04L 67/125
See application file for complete search history.

(56) References Cited

U.S. PATENT DOCUMENTS

| | | |
|---|---|---|
| 7,197,497 B2 | 3/2007 | Cossock |
| 8,180,766 B2 | 5/2012 | Yang et al. |
| 8,214,747 B1 | 7/2012 | Yankovich et al. |
| 8,249,344 B2 | 8/2012 | Viola et al. |
| 8,392,409 B1 | 3/2013 | Kashyap et al. |
| 8,463,774 B1 | 6/2013 | Buron et al. |

(Continued)

OTHER PUBLICATIONS

PCT Invitation to Pay Additional Fees and, Where Applicable, Protest Fee, for PCT/US2016/028474, dated Jul. 13, 2016.

(Continued)

*Primary Examiner* — Merilyn P Nguyen
(74) *Attorney, Agent, or Firm* — Womble Bond Dickinson (US) LLP

(57) ABSTRACT

A method and apparatus of a device that performs a search using a plurality of application states is described. In an exemplary embodiment, the device receives a plurality of application states from a plurality of applications running on a device. The device further creates an index of the plurality of application states. In addition, the device receives a query to search for data stored on the device. Furthermore, the device searches the plurality of application states using the index and the query. The device additionally determines a match for the query of one of the plurality of the application states and returns the match for the matching application state.

23 Claims, 25 Drawing Sheets

(56) References Cited

U.S. PATENT DOCUMENTS

| | | | |
|---|---|---|---|
| 8,510,304 B1* | 8/2013 | Briggs | G06F 16/22 707/736 |
| 8,538,989 B1 | 9/2013 | Datar et al. | |
| 8,600,979 B2 | 12/2013 | Kim et al. | |
| 8,601,023 B2 | 12/2013 | Brave et al. | |
| 8,656,265 B1 | 2/2014 | Paulin et al. | |
| 8,799,358 B2 | 8/2014 | Lingley | |
| 8,995,815 B2 | 3/2015 | Maharajh et al. | |
| 8,996,520 B2 | 3/2015 | Chang et al. | |
| 9,002,821 B2 | 4/2015 | Chang et al. | |
| 9,146,966 B1 | 9/2015 | Popovici | |
| 9,727,648 B2* | 8/2017 | Klotz, Jr. | G06F 16/951 |
| 9,788,071 B2* | 10/2017 | Mason | G06F 16/71 |
| 10,002,200 B2* | 6/2018 | Shapira | G06F 3/04842 |
| 10,146,630 B1* | 12/2018 | Kumar | G06F 16/2237 |
| 10,394,839 B2 | 8/2019 | Prakash et al. | |
| 10,453,325 B2* | 10/2019 | Adler | G08B 21/24 |
| 2002/0184333 A1 | 12/2002 | Appelman | |
| 2004/0215606 A1 | 10/2004 | Cossock | |
| 2004/0267700 A1 | 12/2004 | Dumais et al. | |
| 2005/0165777 A1 | 7/2005 | Hurst-Hiller et al. | |
| 2005/0234929 A1 | 10/2005 | Ionescu et al. | |
| 2005/0259845 A1 | 11/2005 | Dehlin | |
| 2006/0195428 A1 | 8/2006 | Peckover | |
| 2007/0179646 A1* | 8/2007 | Dempski | G06Q 10/10 700/83 |
| 2009/0006431 A1 | 1/2009 | Agrawal | |
| 2009/0064000 A1 | 3/2009 | Garbow | |
| 2009/0125498 A1 | 5/2009 | Cao et al. | |
| 2010/0063878 A1 | 3/2010 | Bachet | |
| 2010/0070486 A1 | 3/2010 | Punaganti Venkata et al. | |
| 2010/0082582 A1 | 4/2010 | Gao et al. | |
| 2010/0174730 A1 | 7/2010 | Leung et al. | |
| 2010/0274783 A1 | 10/2010 | Chevalier et al. | |
| 2010/0306213 A1 | 12/2010 | Taylor et al. | |
| 2011/0087673 A1 | 4/2011 | Chen | |
| 2011/0093820 A1 | 4/2011 | Zhang et al. | |
| 2011/0288931 A1 | 11/2011 | Kuhn | |
| 2011/0314007 A1 | 12/2011 | Dassa | |
| 2012/0023097 A1 | 1/2012 | LeBeau et al. | |
| 2012/0084644 A1 | 4/2012 | Robert et al. | |
| 2012/0102018 A1 | 4/2012 | Yang et al. | |
| 2012/0179955 A1 | 7/2012 | French et al. | |
| 2012/0233181 A1 | 9/2012 | Shehata et al. | |
| 2012/0271806 A1 | 10/2012 | Ieong et al. | |
| 2012/0278304 A1 | 11/2012 | Li et al. | |
| 2012/0324032 A1 | 12/2012 | Chan | |
| 2013/0110815 A1 | 5/2013 | Tankovich et al. | |
| 2013/0110860 A1 | 5/2013 | Taranov et al. | |
| 2013/0111328 A1 | 5/2013 | Khanna | |
| 2013/0124534 A1 | 5/2013 | Dinh | |
| 2013/0179427 A1 | 7/2013 | Archambault et al. | |
| 2013/0227471 A1 | 8/2013 | Cha et al. | |
| 2013/0232128 A1 | 9/2013 | Krishnan et al. | |
| 2013/0262107 A1 | 10/2013 | Bernard | |
| 2013/0290856 A1 | 10/2013 | Beveridge et al. | |
| 2013/0322685 A1 | 12/2013 | Li et al. | |
| 2013/0332442 A1 | 12/2013 | Liu et al. | |
| 2014/0047413 A1 | 2/2014 | Shelve et al. | |
| 2014/0059042 A1 | 2/2014 | Vinay et al. | |
| 2014/0100835 A1 | 4/2014 | Majumdar et al. | |
| 2014/0105488 A1 | 4/2014 | Geng et al. | |
| 2014/0195474 A1 | 7/2014 | Anguera Miro | |
| 2014/0229462 A1 | 8/2014 | Lo et al. | |
| 2014/0236919 A1 | 8/2014 | Liu et al. | |
| 2014/0282178 A1 | 9/2014 | Borzello | |
| 2014/0316890 A1 | 10/2014 | Kagan | |
| 2014/0324813 A1 | 10/2014 | Mathur et al. | |
| 2014/0358970 A1 | 12/2014 | Morris et al. | |
| 2014/0359519 A1 | 12/2014 | Luu et al. | |
| 2015/0046424 A1 | 2/2015 | Lin | |
| 2015/0074615 A1 | 3/2015 | Han et al. | |
| 2015/0112978 A1 | 4/2015 | Arora | |
| 2015/0178348 A1 | 6/2015 | Rohde | |
| 2015/0317320 A1 | 11/2015 | Miller et al. | |
| 2015/0356086 A1 | 12/2015 | Kamotsky | |
| 2016/0094654 A1* | 3/2016 | Raman | H04L 67/1095 715/733 |
| 2016/0179816 A1* | 6/2016 | Glover | G06F 16/24578 707/749 |
| 2016/0188448 A1* | 6/2016 | Sankaranarasimhan | G06F 16/24575 717/128 |

OTHER PUBLICATIONS

Wikipedia: "Google App Indexing: Google can Index & link to Content in Your Android App", Nov. 2, 2013.

Anonymous: "Breadcrumb (navigation)—Wikipedia, the free encyclopedia", Apr. 23, 2009.

Michael Sarlitt: "What is app deep linking and how it drives growth—Mike Sarlitt", Jun. 29, 2014.

International Search Report and the Written Opinion of the International Searching Authority, for corresponding International Application No. PCT/US16/028480, dated Jun. 17, 2016, 14 pages.

International Search Report and the Written Opinion of the International Searching Authority, for corresponding International Application No. PCT/US16/028483, dated Jun. 17, 2016, 12 pages.

International Search Report and the Written Opinion of the International Searching Authority, for corresponding International Application No. PCT/US16/028474, dated Oct. 28, 2016, 19 pages.

App Indexing for Google Search, https://web.archive.org/web, Nov. 11, 2013, 5 pages.

Wikipedia "Web Crawler", https://en.wikipedia.org/, May 16, 2015, 10 pgs.

Cristian Duda, Dianni Frey, Donald Kossmann, Chong Zhou, AJAXSearch: Crawling, Indexing and Searching Web 2.0 Applications, ETH Zurich Honghuan Univ., Aug. 2008, 4 pages.

Mada Seghete, How We Created Contextual Deep Links That Enable Your Apps to Function More Like the Web, Branch.io, Nov. 18, 2014, 7 pages.

Charity Majors, Smart Indexing at Parse, Parse , Apr. 1, 2014, 5 pgs.

PCT Chapter I International Preliminary Report on Patentability (IPRP Chapter I) PCT/US2016/028480 dated Dec. 14, 2017. (11 Pages).

PCT Chapter I International Preliminary Report on Patentability (IPRP Chapter I) PCT/US2016/028474, dated Dec. 14, 2017 (12 Pages).

PCT Chapter I International Preliminary Report on Patentability (IPRP Chapter I) PCT/US2016/028483, dated Dec. 14, 2017 (9 Pages).

U.S. Appl. No. 15/056,697, filed Feb. 29, 2016, Non-Final Action Mailed.

U.S. Appl. No. 14/871,918, filed Sep. 30, 2015, Final Rejection Mailed.

U.S. Appl. No. 14/871,930, filed Sep. 30, 2015, Awaiting 1$^{st}$ Office Action.

U.S. Appl. No. 14/871,947, filed Sep. 30, 2015, Awaiting 1$^{st}$ Office Action.

U.S. Appl. No. 14/871,963, filed Sep. 30, 2015, Final Rejection Mailed.

Google, Add app deep links on your website, Mar. 3, 2015 5 pages.

Raj Hathiramani, How Many of the Top 200 Mobile Apps Use Deeplinks?, URX, Jul. 1, 2014, 7 pages.

Clarke, C.L.A., Cormack, G.V., and Tudhope, E.A., Relevance Ranking for One to Three Term Queries, Information Processing & Management 36, 2000, Elseiver Science Ltd., pp. 291-311.

Song, Rujhua et al., A Proximity Probabilistic Model for Information Retrieval, Microsoft Research, 2011, 8 pages.

Song, Rujhua, Ji-Rong Wen, and Wei-Ying Ma, Viewing Term Proximity Form a Different Perspective, Microsoft Research, 2005, 9 pages.

"App Indexing for Google Search—Getting Started", XP055637075, 1 pg, Nov. 10, 2013.

(56) References Cited

OTHER PUBLICATIONS

Heer J., et al: "Graphical Histories for Visualization: Supporting Analysis, Communication, and Evaluation", IEEE Transactions on Visualization and Computer Graphics, IEEE Service Center, Los Alamitos, CA, US, vol. 14, No. 6, Nov. 1, 2008, pp. 1189-1196, XP011248504, ISSN: 1077-2626.

\* cited by examiner

IN-APPLICATION HISTORY SEARCH

RELATED APPLICATIONS

Applicant claims the benefit of priority of prior, provisional application Ser. No. 62/171,982, filed Jun. 5, 2015, the entirety of which is incorporated by reference.

FIELD OF INVENTION

This invention relates generally to search technology and more particularly to searching application histories on device and among multiple devices, and to generating application views for use in a search index.

BACKGROUND OF THE INVENTION

A user on a device will often perform a query search to lookup information on the Web or from some other data sources, such as objects stored locally on that device. A query search begins with a client receiving a query string, which is sent to a search service. The search service receives the query string and searches one or more search indices for results that match this query string. The indices can reference web pages or other objects available across a network, or can include information about objects located locally on the device (e.g., files, media, contacts, and/or other types of objects stored locally on the device). In addition, many queries performed by a user are satisfied with a web history result. For example, queries input in a web browser can be satisfied up to 60% of the time by a result from a web history.

Thus, it can be useful to be able to search a web browser history. Furthermore, it would be useful to search histories of other applications on the device. This is because a user would have a routine in using the device. For a portable device, this routine can include using applications, especially non-web browser applications. For example, smartphone users spend, on average, 86% of the time using non-web browser applications. However, being able to search history of non-web browser applications can be difficult, as data for usage history of applications are difficult to access (if at all) and may be in proprietary formats. Thus, applications histories are difficult to search.

SUMMARY OF THE DESCRIPTION

A method and apparatus of a device that performs a search using a plurality of application states is described. In an exemplary embodiment, the device receives a plurality of application states from a plurality of applications running on a device. The device further creates an index of the plurality of application states. In addition, the device receives a query to search for data stored on the device. Furthermore, the device searches the plurality of application states using the index and the query. The device additionally determines a match for the query of one of the plurality of the application states and returns the match for the matching application state.

In another embodiment, a device performs a query using a plurality of application states on the device. In this embodiment, the device performs performing the query using an index stored on the device. The device further receives a plurality of results matching the query. In addition, the device determines a subset of the plurality of results that correspond to an application state corresponding to a native application installed on the device. Furthermore, the device presents, for each of the results in the subset of the plurality of results, that result and a representation of the native application corresponding to the result.

In a further embodiment, a device selects an application state for use in a multi-device search. In this embodiment, the device detects, on the device, that the application state has been selected as a query result for a device-level search on that device. The device further transmits the application state to a server, wherein the application state is to be indexed with other application states from other devices.

In yet another embodiment, a device performs a search for a first device using an application state received from a second device. In this embodiment, the device receives a plurality of application states from a plurality of applications running on a plurality of devices. The device further creates an index of the plurality of application states. The device additionally receives a query to search for data stored on the device. In addition, the device searches the plurality of application states using the index and the search query and returns the match for the matching application state.

In a further embodiment, a device performs a search. In this embodiment, the device transmits a query to a server and receives a plurality of results matching the query. The device further determines a subset of the plurality of results that includes an application state generated on another device corresponding to a native application installed on the device. In addition, the device presents, for each of the results in the subset of the plurality of results, a link and a representation of the native application.

In another embodiment, a device indexes an application state in a search query index. In this embodiment, the device receives the application state of the application from another device coupled to the server. The device further generates a view of the application corresponding to the application state, wherein the view is a representation of a user interface of the application corresponding to the application state. In addition, the device indexes the view in a search query index.

In a further embodiment, a device retrieves an application state having an associated view with a query result. In this embodiment, the device sends a query to a server. The device further receives a result to the query from the server, where the result includes the view of an application state of an application corresponding to the result and the view is a representation of a user interface of the application corresponding to the application state. The device additionally presents the result with an indication of the view.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
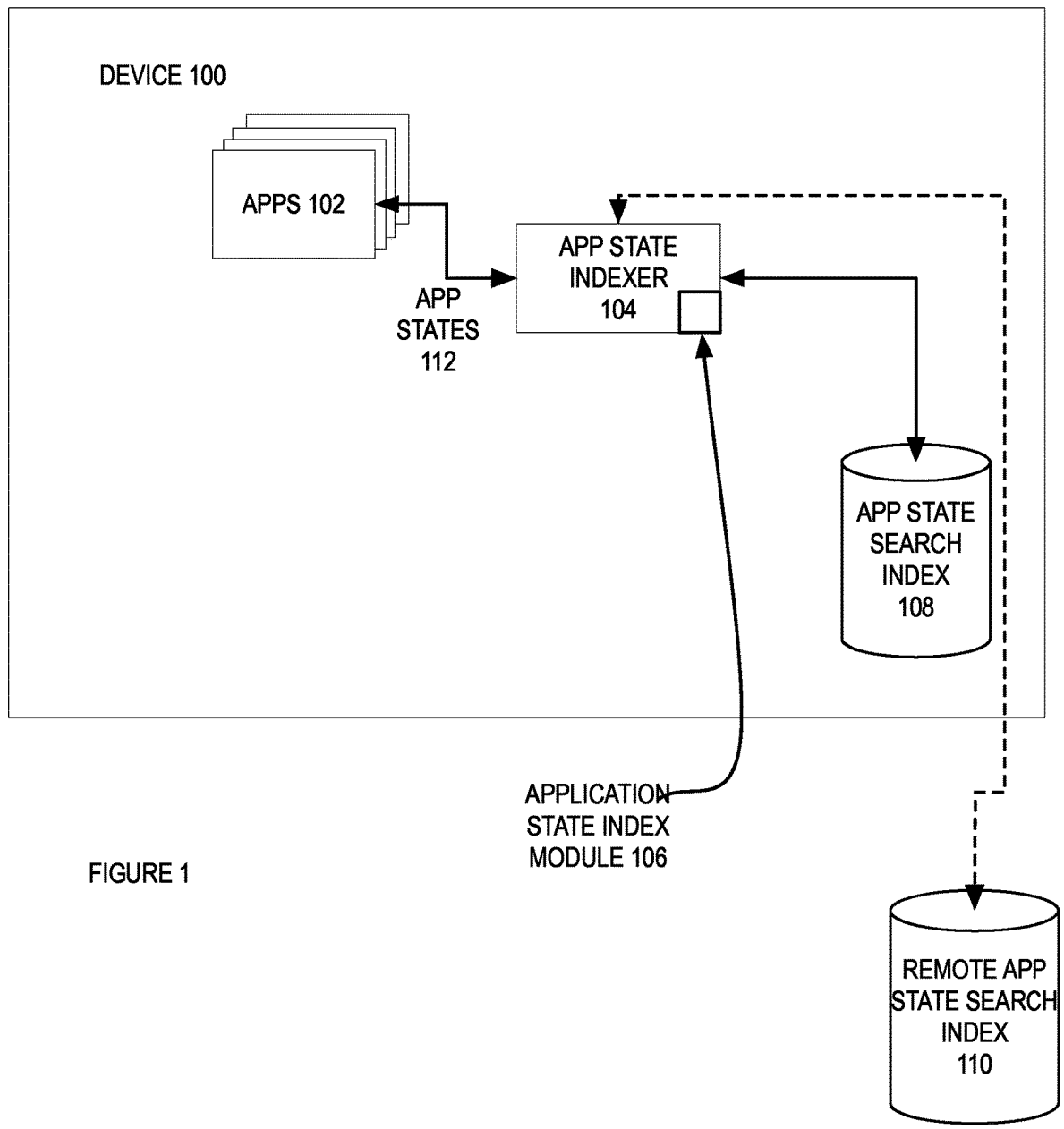
FIG. 1 is a block diagram of one embodiment of a system that indexes application states for use in a local device search index.

A method and apparatus of a device that performs a search using a plurality of application states is described. In the following description, numerous specific details are set forth to provide a thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that performs a search using a plurality of application states is described. As described above, it is useful to be able to search a history of a web browser because users have a digital routine using a web browser. This digital routine can further include accessing the same applications on a repeated basis and using these applications for the same types of operations. As mentioned above, smartphone users spend, on average, 86% of the time using non-web browser applications. However, being able to search a history of non-web browser applications can be difficult, as data for usage history of applications are difficult to access (if at all) and are in proprietary formats. Thus, applications histories are difficult to search.

In one embodiment, a device generates and stores applications states of executing applications. The device further indexes these application states, so that a local search service running on the device can search the indexed application states to serve results for a query. In this embodiment, an application state is a snapshot in time of the application. An application state is analogous to a web browser state stored in a web browser history. In one embodiment, an application state is for a non-web browser application. In one embodiment, an application state for an application can include a title, a view, date that is displayed in this view, associated metadata, and/or other state information for the state. For example and in one embodiment, the application can be a review type application that displays reviews of different business and services for a geographic area. In this example, each application state could be a set of reviews and associated information for a business or service (e.g., name, address, contact information, hours open, description of the business or service, a set of reviews submitted by visitors or users of the service or business, and/or any other type of information associated with that business or service). Each application state can be displayed on one user interface pages or across multiple user pages, where each pages is content organized for display. In one embodiment, each of the executing applications exports one or more application states, where the device indexes the applications states in an application state index.

By indexing the application states, a user can search a history of the applications. This allows the user to search and find previous application states. With a found application state, the user can launch the corresponding application with this application state, which brings the application to point where the application was executing when the application exported the application state. A user can use the indexed application states to return the application to a previously used state via a common mechanism for multiple different applications. For example and in one embodiment, the application state could be of page of a transit application for a particular route of a transit system. In this example, a user may navigate in the transit application to particular route, such as a local bus route 7. By navigating to that particular route, the transit application would export an application state for that local bus route page to the application state index. With this application state indexed, a user may retrieve that application state via query. For example and in one embodiment, the user could input "bus route 7" in a query, and the application state for the local bus route 7 would appear as a query result. Upon selection of this application state, the transit application would be loaded with the application state for local bus route 7 and the page for local bus route 7 in this transit application would be displayed for the user. Thus, in this example, the transit application is taken to the same state as was executing previously.

In another embodiment, the device can export application states to a remote application state indexer that can be used to support queries from devices that did not generate these application states. In this embodiment, the device exports application states that have been engaged by a user, where an engaged application state is an application state has been returned as a query result in response to a query by the user on the device and that user has selected that application state. In addition, the device sanitizes the application state by removing private information prior to exporting the application state. The remote application state indexer receives this application state and indexes the application state if the remote application state indexer has received this application state a requisite number of times. In this embodiment, by indexing the application state after a requisite number of times, this application state has been crowd-sourced, such many different users and/or devices have engaged this applications state in a local search. In one embodiment, requiring a certain number of engagements for an application state increases the likelihood that this application state is useful to other users. Once indexed, a remote search service can search the remote application state index to determine if there are application states that match a query. For each match, the remote search service returns the matching application state(s) to a client. On the client, a user can select the application state, where the corresponding application is launched and brings the application to point where the application was executing when the application exported the application state.

In a further embodiment, a device generates application state views for different application states. In this embodiment, the application state view is a representation of a user interface of the application corresponding to that application state. For example and in one embodiment, a review type application that has access to content for thousands or millions of reviews for businesses and services can have a view for each of the thousands or millions of reviews. These views can be used to preview the application state and also the application in general. In one embodiment, these application state views can be used to preview an application state that is returned in a set of results for a query or can be used in general to preview application. In one embodiment, collecting a number of application state views for one application can be used to preview that application in an application store. For example and in one embodiment, a review type application may have dozens of application state views available for this application.

FIG. 1 is a block diagram of one embodiment of a system that indexes application states for use in a local device search index. In FIG. 1, device 100 includes multiple applications 102 that are coupled to the application state indexer 104. In one embodiment, the device 100 is any type of device that can communicate network data with another device (e.g., a personal computer, laptop, server, mobile device (e.g., phone, smartphone, smartwatch, personal gaming device, etc.), another network element, etc.). In one embodiment, the device 100 can be a virtual machine or can be a device that hosts one or more virtual machines. In one embodiment, the device 100 additionally includes an application state search index 108. In one embodiment, each of the applications 102 is an executing program that progresses through a series of states while that application is running. For example and in one embodiment, an application 102 can be a word processing application, spreadsheet, contacts, mail, phone, web browser, media player, review application, classified advertisement application, social networking, productivity, utility, game, real estate, photo, video, e-commerce, storefront, coupon, operating system, and/or any other type of application that can run on the device.

As described above, each of the applications 102 progresses through a series of states while that application is executing. In one embodiment, one of these application states is a snapshot in time of the application. In one embodiment, an application state for an application 102 can include a title, a user interface state, data that is displayed in this user interface, associated metadata, and/or other state information for the state In a further embodiment, the application state includes information that describes how the state should render in search results. For example and in one embodiment, the application 102 can be a review type application that displays reviews of different business and services for a geographic area. In this example, each application state could be a set of reviews and associated information for a business or service (e.g., name, address, contact information, hours open, description of the business or service, a set of reviews submitted by visitors or users of the service or business, and/or any other type of information associated with that business or service). In one embodiment, the application state title is a title given for that application state, such as the name of that business or service, in the case of a review type application. A user interface state for an application state could be a representation of a user interface of the application 102 corresponding to that application state. In this embodiment, the user interface state can include the representation of the user interface, where that user interfaces scroll to or which component of the user interface is active, and/or what mode the application may be in (e.g., the application 102 may have different modes that is used to present information to the user). In a further embodiment, the application may be small enough to include a title plus a Uniform Resource Locator or application identifier and version numbers of the application that are compatible with the state.

In one embodiment, each application state includes title, searchable data and/or metadata and application-specific opaque data. In this embodiment, the searchable data and/or metadata is data that is designated by the application 102 as data that is accessible by a search indexing service and/or a query search service where this searchable data and/or metadata can be used to index the application state and also be used to return application state as a result of the query. For example and in one embodiment, the searchable data and/or metadata can be the content in the application state (e.g., application state title, content that is displayed in the user interface state, media data, location data, time data, or any other type of data or metadata that can be used for search index). In one embodiment, the application-specific opaque data is application-specific data that is used to return the application to its previous state and may or may not be data that is searchable. In this embodiment, loading an application state by the corresponding application 102 returns that application to the application state. For example and in one embodiment, the application-specific opaque data may include a user interface state, the user-interface mode, and/or a reference to a resource. The user interface mode may be the type of mode user faces currently using. For example and in one embodiment, a word processing program can be a draft layout view or print layout view; and an image-editing program can be in the library mode, an image editing mode, or print mode. In one embodiment, the referenced resource can be filed that is being viewed or edited, a uniform resource locator to a resource that can be on the device or on another device, such as a server across a network. In one embodiment, the data that is part of the application state can be in a dictionary with (key, value) pairs.

In one embodiment, one or more of the applications 102 each export one or more application states to the application state indexer 104. In this embodiment, the applications 102 can each export the application states on a fixed or variable schedule. For example and in one embodiment, the applications 102 can export the application states on a fixed time basis, export and application state for each new user interface state, after one or more interactions with the user, or some other metric. As another example and in another embodiment, a review application may navigate to a new review or review search. In this example, by navigating to a new review or review search, a new view is generated and a new application state is created and exported to the application state indexer 104. The application state indexer receives the application states and adds the application state to the application index 108. By adding the application state to the index, the new application state is available to a local search service for matching queries received by the local search service. In another embodiment, the application state can be exported to a remote search application state index 108, which is described in FIGS. 6-11 below.

Figure 2:
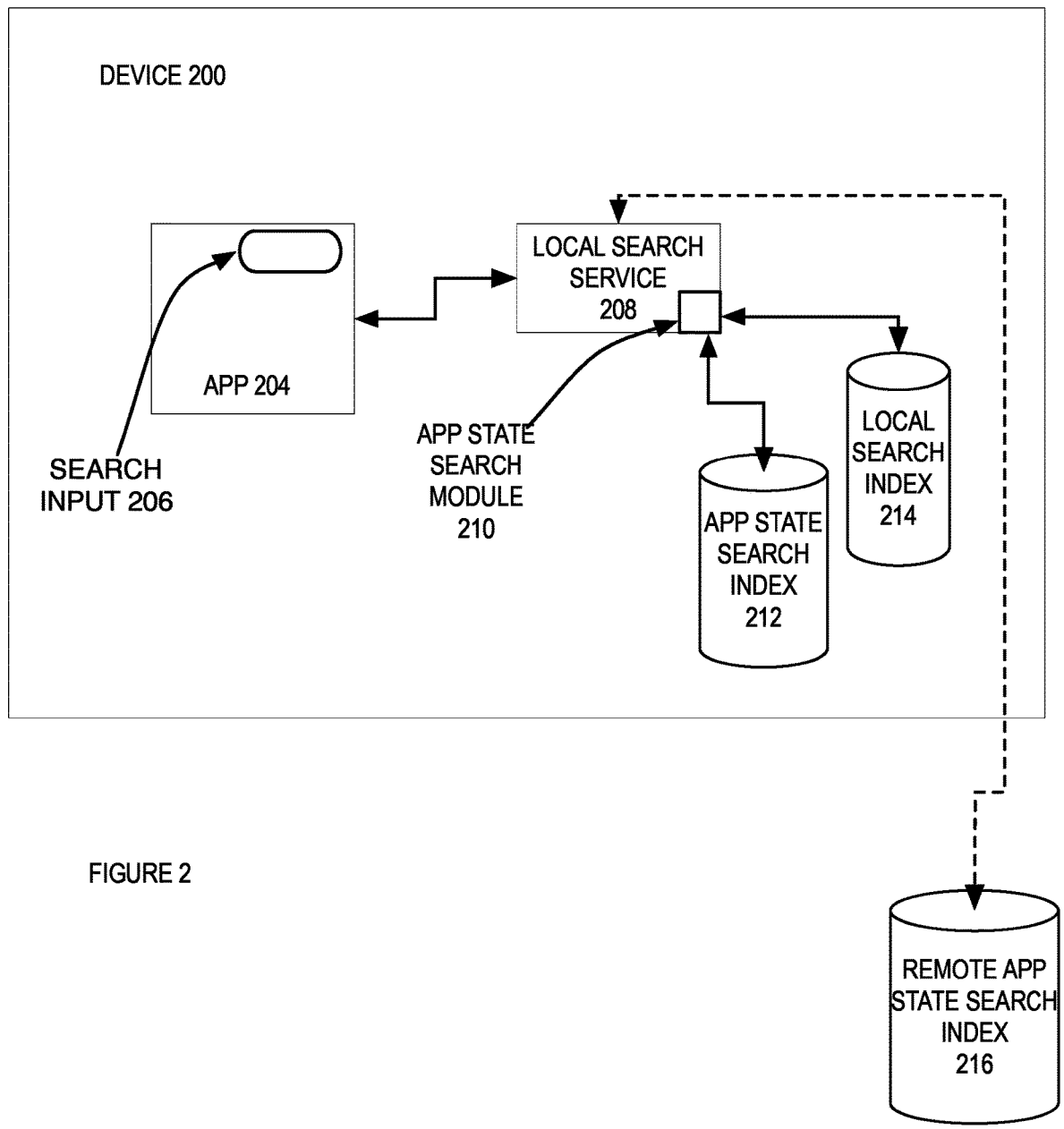
FIG. 2 is a block diagram of one embodiment of a system that searches application states using an on-device application state search index.

FIG. 2 is a block diagram of one embodiment of a system that searches application states using an on device application state search index. In FIG. 2, device 200 includes an application 204 that is coupled to a local search service 208. The local search service 208 is further coupled to an application state search index 212 and a local search index 214. In one embodiment, the device 200 is a device as in FIG. 1. In one embodiment, the application 204 includes a search input field 206. In this embodiment, the search input field is used to input a query that can be used by the local search service to perform a search using this query. If a query is inputted to the search input 206, the application 204 sends this query to the local search service 208. The local search service 208 receives the query and produces ranked results by searching the local search index 214 and/or the application state search index 212 to determine a set of results for the query. In addition, the local search service 208 ranks the results and sends them back to the application 204.

In this embodiment, a search can include a search of the objects stored on the device 200. For example and in one embodiment, the objects can be documents, pictures, music, applications, email, calendar entries, and/or other objects stored in the local search index. In one embodiment, the search is based on an index that is maintained by the search module. In this embodiment, the index is an index of the metadata stored in objects of the device. In an alternative embodiment, the local search service 208 can also apply the query to the application state search index 212. In this embodiment, the local search service 208 applies to query to the application state search index 212 to determine if there any application states that match the query. For example and in one embodiment, the local search service 208 applies the query to the searchable data for each of the application states stored in the index 212. In this example, if there is a match to the query for one or more application states in the index 212, the local search service 208 returns a set of results to the application 204 that includes these one or more application states. The application 204 displays the ranked results. If one of the ranked results for display is an application state, the application can display an icon of the application, the application state title, and an application state summary. In one embodiment, upon selection of the displayed application state, the application corresponding to the application state is loaded with that application state. In this embodiment, by loading application with the application state, the application is loaded in an execution state that corresponds to the application state. For example in one embodiment, if the application state is a particular coupon (e.g., (50% weekend rental cars!") for a coupon application, the coupon application is loaded with this application state and the application state displays particular coupon as if the user had navigated to that coupon.

Figure 3:
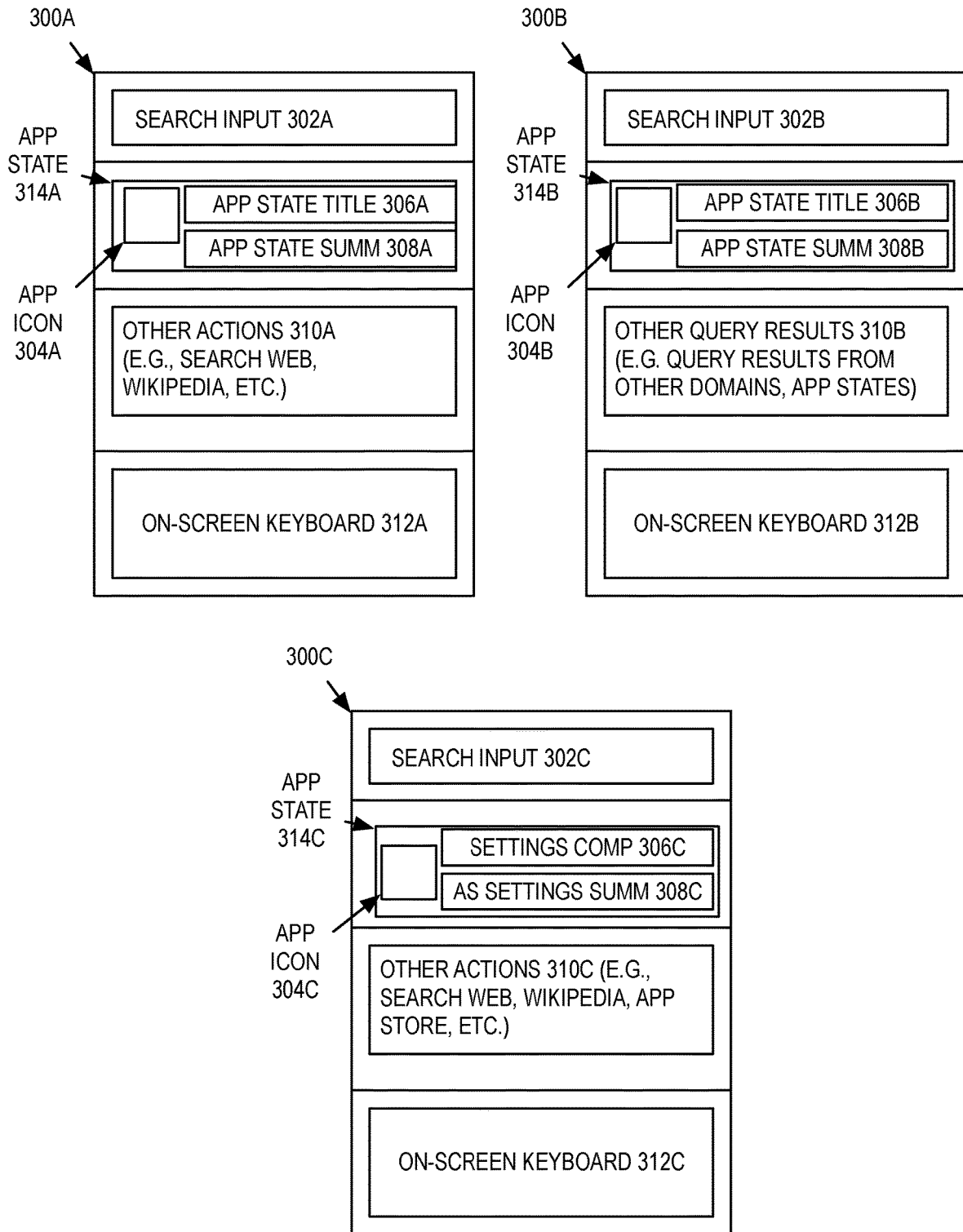
FIG. 3 is a block diagram of embodiments of user interfaces that display an application state query results among other query results.

FIG. 3 is a block diagram of embodiments of user interfaces that display an application state query results among other query results. In FIG. 3, three different possible user interfaces 300A-C to display an application state on a device are illustrated. In one embodiment, user interface 300A includes a search input 302, application state display 314A, other actions 310A, and on-screen keyboard 312A. In one embodiment, the search input 302A is used to input a query by the user of the device. In this embodiment, a partial or whole query can be entered and sent to the local search service in order to determine one or more sets of query results. In one embodiment, results for the query are returned as one or more characters of the search are entered. In addition, the application state display 314A includes an application icon 304A, application state title 306A, and application state summary 308A. In one embodiment, the application icon 304A is an icon representing the application corresponding to the application state. In this embodiment, the application icon 304A may be part of the application state returned from the query or retrieved based on information stored in the application state. In one embodiment, the application state title 306A is a title for the application state that is stored in the application state. Furthermore, the application state summary 308A is a summary of the application state. For example and in one embodiment, the application state summary 308A includes a description of the application state, such as a description of the content of the application state. In this example, the application state summary 308A can give an indication to the user of the content that is associated with the application state.

In one embodiment, the user interface 300A can include other actions 310A, in addition to displaying a query result that includes an application state 314A. For example in one embodiment the other actions 310A can include a link to search the web with the query or to search an online encyclopedia with the query. The user interface 300A can also include an on-screen keyboard 312A that is used by a user to input a search query. Alternatively, the query can be entered via other means (e.g., via a microphone coupled to the device, by another device coupled to the device, such as a smart watch coupled to a portable device). In one embodiment, the icon 304A could be an image thumbnail specific to the app state provided by the app. In addition, the icon 304A can also be a video or a video preview. In a further embodiment, the application state summaries can include an "action" buttons, such Phone Call icons, Play, Directions, Purchase.

In one embodiment, there are many different types of application states that can be displayed as a query result. For example and in one embodiment, the application state could be of view of a transit application for a particular route of a transit system. In this example, a user may navigate in the transit application to particular route, such as a local bus route 7. By navigating to that particular route, the transit application would export an application state for that local bus route view to the application state index. With this application state indexed, a user may retrieve that application state via query. For example and in one embodiment, the user could input "bus route 7" in a query, and the application state for the local bus route 7 would appear as a query result. Upon selection of this application state, the transit application would be loaded with the application state for local bus route 7 and the user interface for local bus route 7 in this transit application would be displayed for the user. Thus, in this example, the transit application is taken to the same state as was viewed previously.

As another example and in another embodiment, a user may use a food delivery application and the user just wants to reorder one of their previous orders. In this example, the user may order pho soup from a local restaurant using application specific for that local restaurant. In this order, the local restaurant application would export an application state corresponding to the order of the pho soup. This application state would be indexed and accessible by the local search service. The user may later enter a query "pho soup," "Vietnamese restaurant," or the name of the local restaurant, and the application state corresponding to this order could be one of the results. This application state may also be the top hit for this result. Upon selection of this application state, the local restaurant application would be launched and display the previous order of pho soup sop that the user may complete the order for the soup.

In a further example and embodiment, the user may maintain a picture board to plan their next wilderness trip. In this example, the user uses a picture board application to link pictures and comments regarding this next trip. The user would come back to this particular picture board using the picture board application in order to add the links from the clipboard of the device. The picture board application would export this application state of the picture board for the wilderness trip in this application state would be available by the local search service. By searching for this application state, such as the name of the place of the trip, the user could quickly go to that wilderness trip picture board within the picture board application via a query instead of launching the picture board application and navigating to this particular picture board view.

In one embodiment, saving an application state can be used to quickly access particular views of a utility that may be difficult to navigate to. For example and in one embodiment, a device settings application may have a multitude of options that are many levels deep. In this example, the user may go to the battery usage page in the settings application to see which application is consuming the most of the battery. The battery usage page may be four or more levels deep and difficult to access. By exporting the application state for the better usage page of the settings application, the user may be able to enter a query "battery usage," "battery," "batter," or some other prefix of the word battery usage to get the application state of the battery usage page of the settings application to appear as a result for the query. This would provide a quick access to a possibly difficult to navigate to page in the settings application.

In another embodiment, an application state result for a query may be shown with other query results from other domains, such as the local search index as described in FIG. 2 above. In FIG. 3, user interface 300B displays an application state 314B along with other query results 310B. In this user interface 300B, the search input 302B is displayed along with the application state 314B, the other query results 310B, and an on-screen keyboard 312B. in one embodiment, the search input 302B and the on-screen keyboard 312C is the same as described above for user interface 300A. In addition, the application state 314B includes an application icon 304B, application state title 306B, and an application state summary 308B, which are the same as the application icon, application state title and application state summary as described above for user interface 300A. Furthermore, user interface 300B includes other query results 310B, which can be other query results from other domains or application states. For example and in one embodiment, the other query results 310B for the query "battery" could include objects index in the local search index matching the word "battery," other application states matching the word "battery," or other query results matching a local or remote search index (e.g., a web search index) matching the word "battery."

As described above, an application state may also be saved for utility application running on the device. For example in one embodiment, these settings application for the device that is used to configure a device can also export application states. User interface 300C is an example of a query result that includes an application state for the settings application. In FIG. 3, the user interface 300C, the search input 302C is displayed along with the application state 314B, the other actions 310C, and an on-screen keyboard 312C. In one embodiment, the search input 302C and the on-screen keyboard 312C for the same as described above for user interface 300A. in addition, the application state 314C includes an application icon 304B, application state title 306C for the component of the settings application (battery usage, for example), and an application state summary 308C for the component of the settings application (battery usage).

Figure 4A:
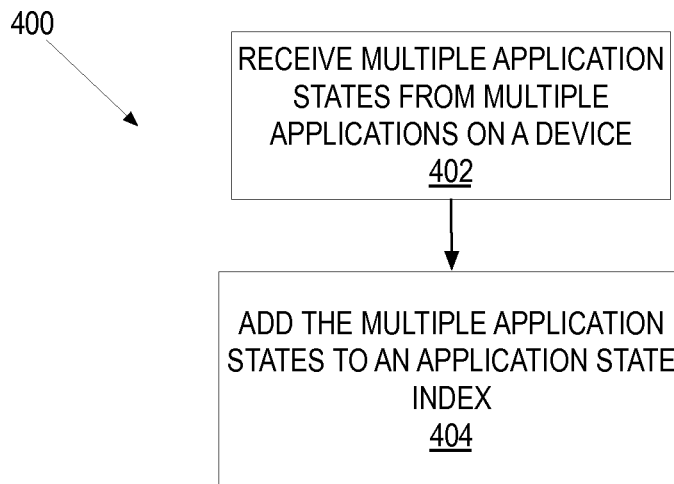
FIG. 4A is a flow diagram of one embodiment of a process to index application states received from multiple different applications on a device.

As described above, in order for application states to be accessible by a local search service, the application states are added to an index that is accessible by the local search service. FIG. 4A is a flow diagram of one embodiment of a process 400 to index application states received from multiple different applications on a device. In one embodiment, process 400 is performed by an application state indexer, such as the application state indexer 104 as described above in FIG. 1. In FIG. 4A, process 400 begins by receiving multiple application states from multiple applications on a device at block 402. For example and in one embodiment, process 400 can receive application states from a variety of applications, such as a word processing application, spreadsheet, contacts, mail, phone, web browser, media player, review application, classified advertisement application, social networking, productivity, utility, game, real estate, photo, video, e-commerce, storefront, coupon, operating system, and/or any other type of application that can run on the device. In one embodiment, the applications can send the application state to process 400 concurrently, serially, and/or a combination thereof. At block 404, for each application state that process 400 receives, process 400 adds those application states to the application state index. In one embodiment, process 400 adds an application state to the application state index by adding an application state identifier, indexable text, application identifier, and/or insertion time to a search index data structure (e.g., the inverted index and completion tries).

Figure 4B:
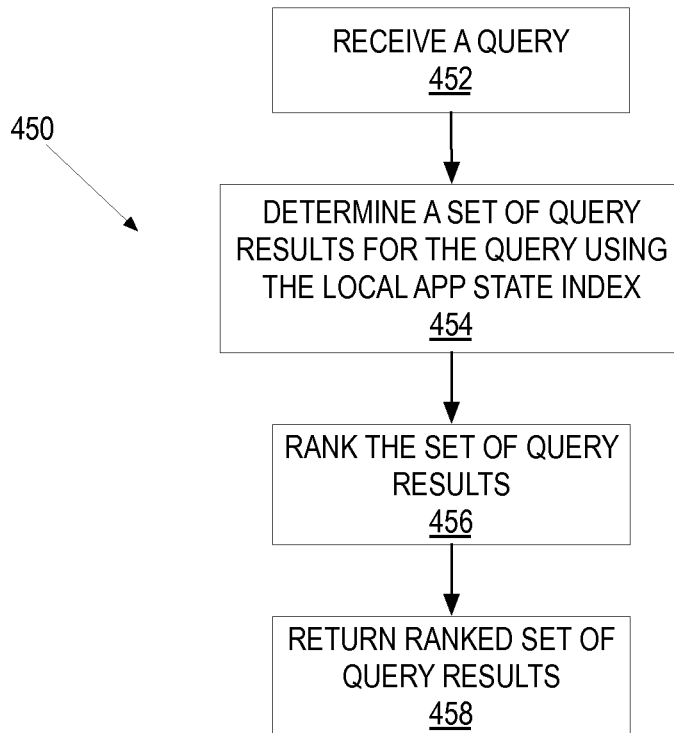
FIG. 4B is a flow diagram of one embodiment of a process to determine query results for a query using an application state index.

By adding multiple application states to the application state index, these index application states are available for a query search by a local search service. FIG. 4B is a flow diagram of one embodiment of a process 450 to determine query results for a query using an application state index. In one embodiment, process 450 is performed by a local search service to determine query results for a query using an application state index, such as local search service 208 as described in FIG. 2 above. In FIG. 4B, process 450 begins by receiving a query at block 452. In one embodiment, the query is a search string that is input by a user in an application and sent to process 450. In one embodiment, the input can be entered by text, spoken word, automatically generated, and/or some other way to entry a query prefix. For example and in one embodiment, the user can enter a query in web browser or file browser. A block 454, process 450 determines a set of query results for the query using the local application state index. In one embodiment, process 450 uses the information in the query to determine matching application states in the local application state index. At block 456, process 450 ranks the set of query results. In one embodiment, the ranks are based on the scores for each of the application states that match the query. Process 450 returns the ranks set of query results at block 458. In one embodiment, process 450 sends the ranked set of query results back to the application that sent the query to process 450.

Figure 5:
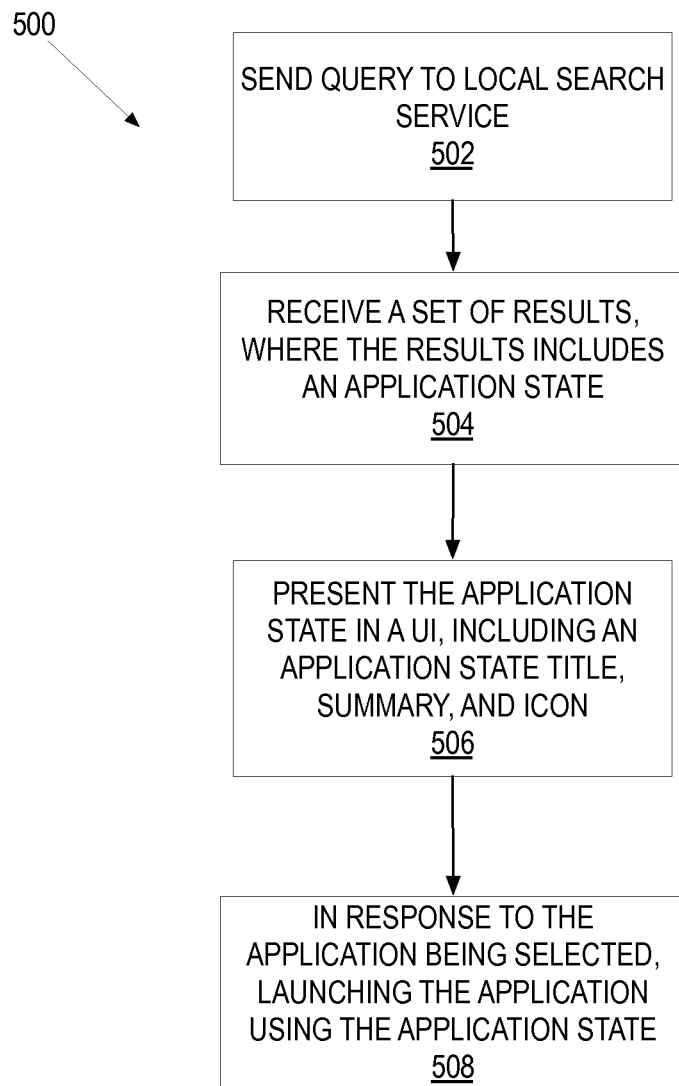
FIG. 5 is a flow diagram of one embodiment of a process to receive and present an application state as part of a query result.

FIG. 5 is a flow diagram of one embodiment of a process 500 to receive and present an application state as part of a query result. In one embodiment, process 500 is performed by an application to receive and present an application state as part of the query result, such as application 204 described in FIG. 2 above. In FIG. 5, process 500 begins by sending a query to a local search service at block 502. In one embodiment, the query can be a search string that is input by user in the application and sent to the local search service.

In this embodiment, the input can be entered by text, spoken word, automatically generated, received from a coupled device (e.g., a smart watch coupled to a portable device), and/or some other way to enter a search string. In another embodiment, a query could be suggested by the search system and the user could pick one query out of multiple selections. Alternatively, the query could be extracted from a context. For example and in one embodiment, the user is reading a text message and goes to search, the query is extracted by a data detection system and issued automatically, or suggested to user. Furthermore, a query could be issued by following a link from another application. At block 504, process 500 receives a set of results, where the results include an application state. In one embodiment, the set of results are ranked with the top-ranked result being a top hit. At block 506, process 500 presents the application state in a user interface. In this embodiment, the application state includes an application state title, summary and an indication of an icon corresponding to the application for this application state. In one embodiment, process 500 displays the application state as described in FIG. 3 above. In response to the application being selected, process 500 launches the corresponding application using the selected application state. For example and in one embodiment, if the application state is a review of a local restaurant for a review type application, process 500 launches the review type application with the local restaurant application state. In this example, the review type application would be launched such that the view presented to the user is the one of the local restaurant in the review type application. In one embodiment, if the application is not installed on the device, process 500 can download the application from a remote source, such as an application store, webpage, or other remote server. In this embodiment, process 500 would install the application and launch the application using the selected application state.

Figure 6:
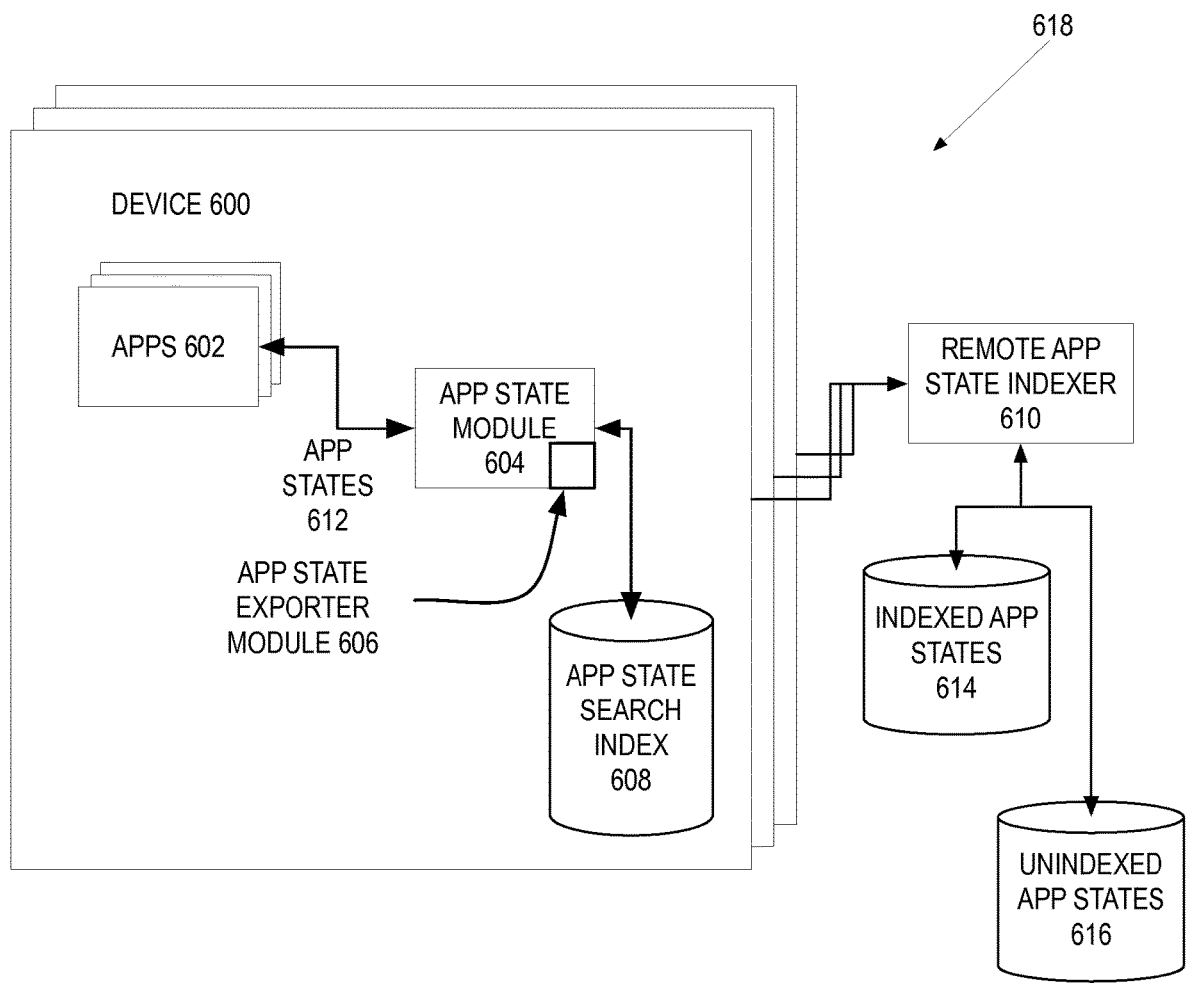
FIG. 6 is a block diagram of one embodiment of a system that indexes application states for use in a remote search index.

As described above, multiple applications can export application states that are indexed locally on the device executing these applications. In one embodiment, these application states can further be exported to a remote application state indexer and be used to support queries from devices that did not generate these application states. FIG. 6 is a block diagram of one embodiment of a system 618 that indexes applications states for use in a remote search index. In FIG. 6, devices 600 are coupled to a remote application state indexer 610. In one embodiment, each of the devices 600 includes multiple applications 602 executing on that device 600, and each of the applications 602 are coupled to an application state module 604 on the device. In this embodiment, each of the applications 602 will export one or more application states 612 to the application state module 604. In this embodiment, the application state module 604 indexes the received application states in an application state search index 608 as described above in FIGS. 1-5. In another embodiment, these application states can be sent to a remote application state indexer 610. By sending the application states to a remote application state indexer 610, these application states can be made available to support queries from other devices not illustrated. Thus, in this embodiment, indexed application states from multiple applications running on multiple devices can be used for query results in response to queries sent by devices that did not generate these application states.

In one embodiment, each application state that is indexed locally may also be exported to the remote application state indexer 610. In this embodiment, thousands or millions of application states could be generated and sent to the remote application state indexer 610. However, with these many application states being exported and indexed, this may create an application state index that is too large and/or with many spurious entries that are not useful. In addition, one some or all of the application states exported may include private information that is not desirable to be included in the indexed application state 614.

In one embodiment, the application state module 604 exports application states to the remote application state indexer 610 if those application states have been engaged on the device. In this embodiment, in order to engage an application state, the application state module determines if that application state has been returned as a query result in response to a query by the user on the device and that user has selected that application state. In one embodiment, engaging an application state means that the user has sent a query to a local search service, the local search service has returned that application state in a set of query results, and the user has selected or viewed that application state. In one embodiment, engaging application state indicates to the application state module 604 that this particular application state could be more important than other application states generated by the device 600. For each engaged application state, the applications state module 604 exports that application state to the remote app state indexer 610.

In a further embodiment, prior to exporting the engaged application state to the remote application state indexer 610, the application state module 604 sanitizes the application state by removing any possible private information that may be in the application state. In one embodiment, the application state may include private information such as usernames, private contact information, location, time accessed, social security numbers, bank account numbers, and/or any other type of private information that may be in the application state. In one embodiment, the application that creates the application state may mark certain information as being private that is stored in the application state. In another embodiment, the device may add private information to that application state. Alternatively, the application state module 604 may know that certain information is private, regardless of whether the information is marked private or not. In either of these embodiments, the applications they module 604 would remove this private information.

The remote application state indexer 610, in one embodiment, receives the application states from the multiple devices 600. The remote application state indexer 610 can receive application states from a few devices or as to as many as thousands or millions of devices. In addition and in one embodiment, the remote application state indexer 610 maintains two sets of application states. One set of application states is the indexed application state 614. These are the set of application states that have been indexed and available for use by a searching service. The other set of application states are the unindexed application state 616. In one embodiment, the remote application state indexer 610 adds an application state to the index set of application states once the application state has been engaged by one or more devices a requisite number of times. For example and one embodiment, an application state is added to the indexed set of application states if that application state is engaged 50 times. In alternate embodiments, an application state can be added to the index set of application states if that application state has been engaged more or less times. In one embodiment, the number of requisite times and application state is to be engaged before being indexed in the application index can vary depending on the type of application state. For example and in one embodiment, an application state that includes geographically localized information (e.g., an application state for a regional coupon) may need to be engaged a fewer number of times as opposed to an application state that does not have the geographically localized information.

In this embodiment, indexing the application states after a requisite number of times that application state has been engaged increases the likelihood that this application state is useful for other users. For example in one embodiment, many different user on different devices use a local transit application and generate application states for the local bus route 7. In this example, this is popular route, so this application state is engaged by the users by accessing this application state via a local search service. This application state is indexed by the remote application state indexer 610 and is available to a remote search service.

In one embodiment, the remote application indexer 610 determines if an application state has been sent before by computing a hash for that application state. If this hash matches other hashes stored by the remote application indexer 610, the remote application indexer 610 increments the number of times that application state has been received by the remote application indexer. If the requisite number of times has been received, the remote application indexer 610 indexes that application state. Indexing an application state is further described in FIG. 9 below.

Alternatively, the device 600 may also send the application states directly to other devices that are trusted by device 600. In one embodiment, the device 600 sends the application states to other devices that are trusted by device 600. For example and in one embodiment, the device 600 can be in a circle of trust with the other devices. The device 600 can send the application states as they are generated by device 600 or the device can application states that have been engaged by the user and/or sanitized as described above. The other device can use these received application states by add them to a locally maintained application state index for query searches as described above. Alternatively, each of the other devices can index the application states that have been received a requisite number of times.

Figure 7:
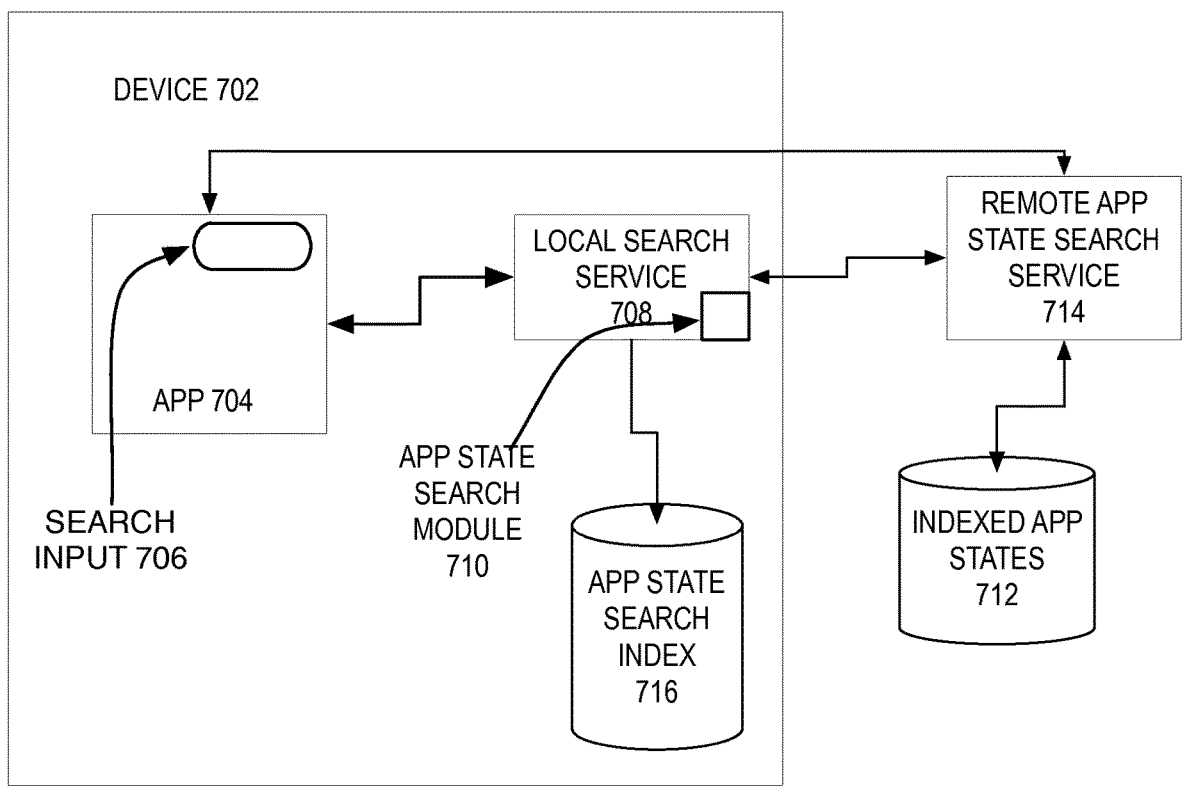
FIG. 7 is a block diagram of one embodiment of a system that searches application states using a remote application state search index.

FIG. 7 is a block diagram of one embodiment of a system that searches application states using a remote application state search index. In FIG. 7, a device 702 is coupled to a remote application state search service 714. In one embodiment, the device 702 includes an application 704 that is coupled to a local search service 708. The local search service 708 is further coupled to an application state search index 716. In one embodiment, the device 702, application 704, local search service 708, and application state search index 716 are the device, application, local search service, and application state search index as described in FIG. 2 above. In another embodiment, the local search service 708 can forward the query to the remote application search service 714, where the remote application search service 714 determines if there is a set of results for the query. The remote application search service 714 returns the set of results to the local search service 708, which in turn, returns the set of results to the application 704. Alternatively, the application 704 can send the query to the remote application search service 714, which in turn sends the set of query results back to the application 704.

As described above, the remote application state search service 714 receives a query from the device 702 and returns a set of query results for that query back to the device 702. In one embodiment, the remote applications state search service 714 receives the query searches the index application states 712 for application states matching the received query, scores each of the matching application states, ranks this set of results, and returns the ranked results to the application. The application 704 displays the results for that includes the application state. In one embodiment, the application 704 displays an icon of the application, the application state title, and an application state summary as described in FIG. 3 above. Upon selection of the displayed application state, the application is loaded with the application state. In one embodiment, the application is in the same state as the application would be as if the user had engaged this application state if this application state was locally stored on this device.

Figure 8:
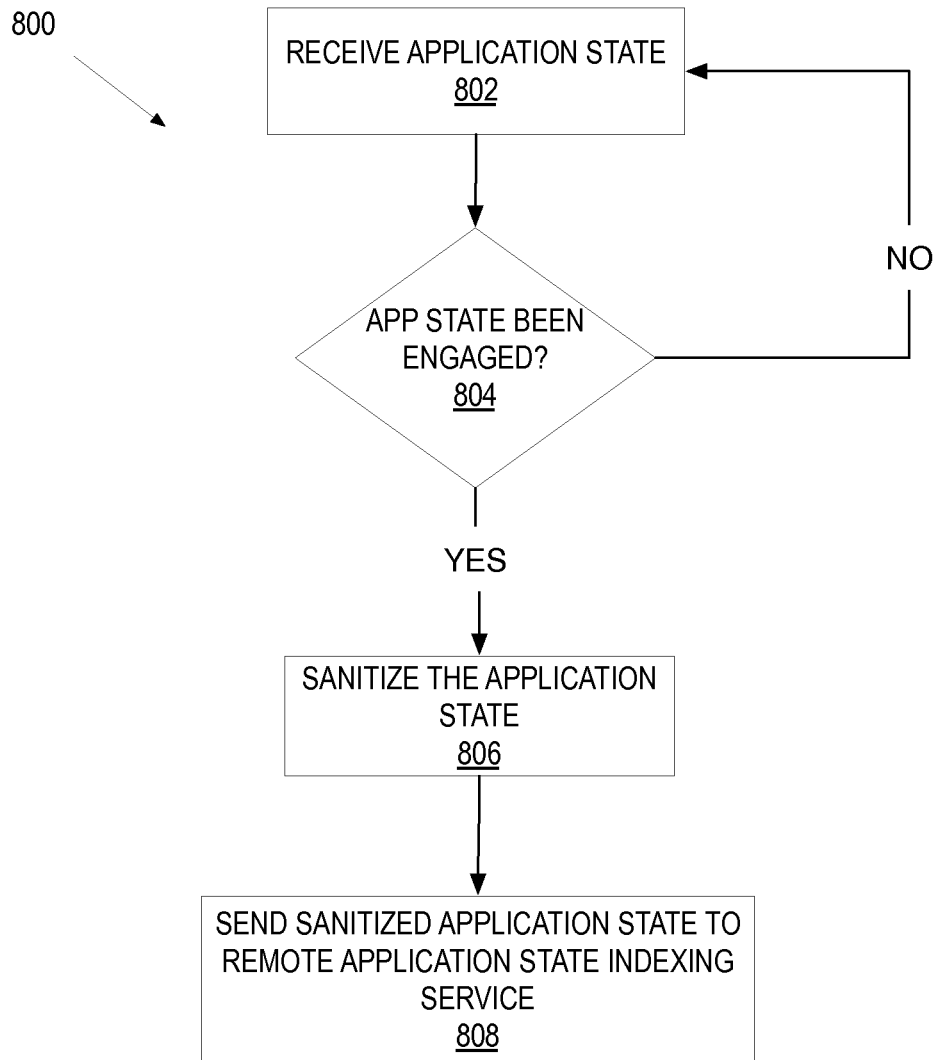
FIG. 8 is a flow diagram of one embodiment of a process to add an application state to an application state index.

FIG. 8 is a flow diagram of one embodiment of a process 800 to add an application state to an application state index. In one embodiment, process 800 is performed by an application state exporter module to add an application state to an application state index, such as the application state exporter module 606 as described in FIG. 6 above. In FIG. 8, process 800 begins by receiving an application state at block 802. In one embodiment, the application state is received by process 800 from one or more applications are running on the device that is executing process 800. At block 802, process 800 determines if the application state has been engaged. In one embodiment, an application state is engaged if that application state is returned in a set of results matching the query and the user has selected that application state to load into an application. If the application state has not been engaged, execution proceeds to block 802 above. If the application state has been engaged, process 800 sanitizes the application state of block 806. In one embodiment, process 800 sanitizes the application state by removing private information associated with and/or stored in the application state as described above in FIG. 6. A block 808, process 800 sends the sanitized application state to a remote application state indexing service. In one embodiment, the remote application state indexing service possibly adds this application state to an application state index.

Figure 9:
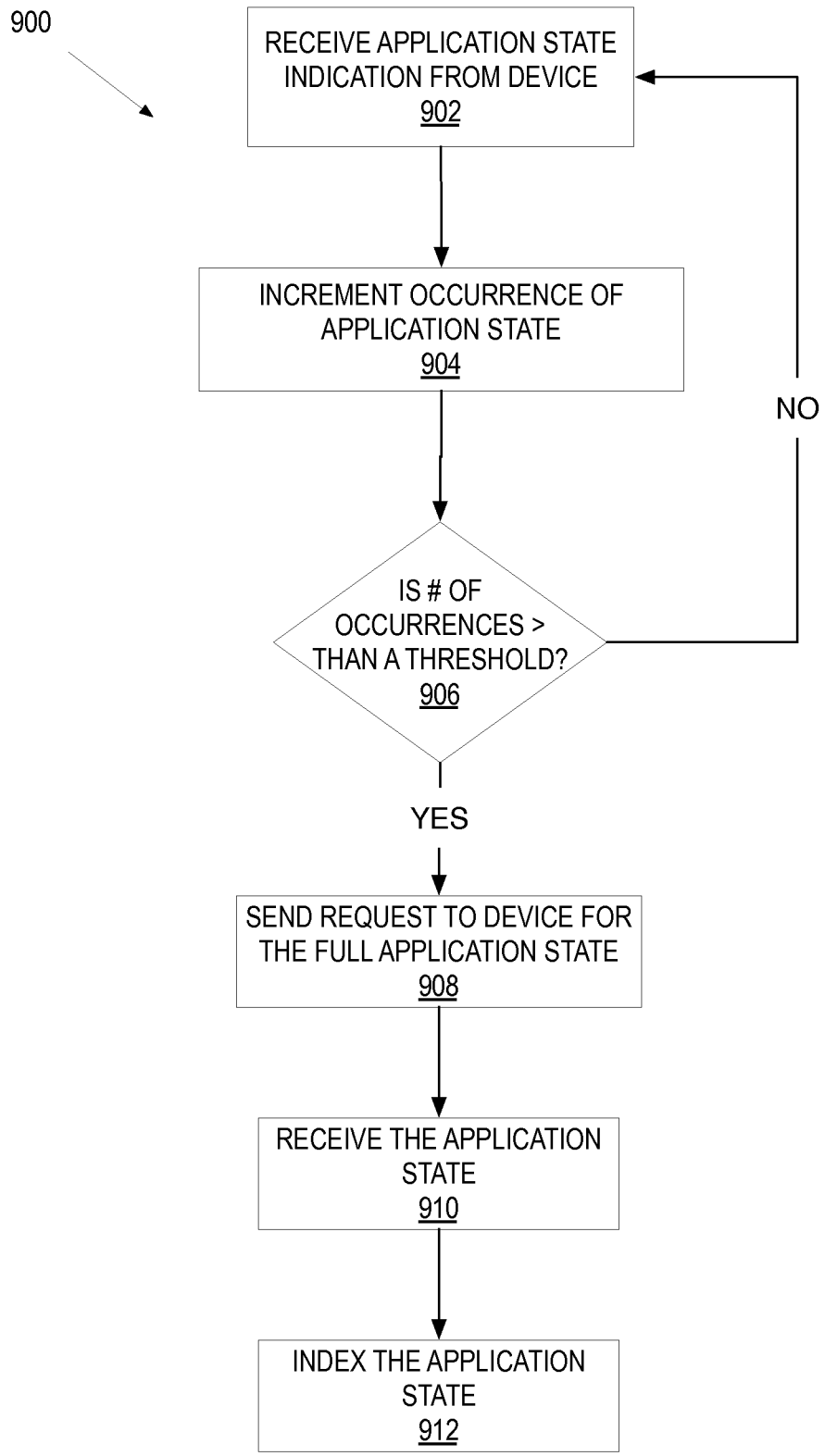
FIG. 9 is a flow diagram of one embodiment of a process to export an application state to an application state indexing service.

FIG. 9 is a flow diagram of one embodiment of a process 900 to index an application state by an application state indexing service. In one embodiment, process 900 is performed by a remote application state indexer to index and application state, such as the remote application state indexer 610 as described in FIG. 6 above. In FIG. 6, process 900 begins by receiving an indication application state from a device that block 902. In one embodiment, the application state indication is a hash of the application state. By receiving an application state hash instead of the full application state, process 900 does not receive the application state until the application state is common across multiple clients or has been engaged a requisite number of times. At block 904, process 900 increments the number of occurrences of this application state. In one embodiment, process 900 maintains a counter of this application state hash. If this is the first time process 900 has received this indication, the counter is 1. Process 900 determines if the number of occurrences is greater than a threshold at block 906. In one embodiment, an application state that has been received by process 900 the requisite number of times means that this application state has been engaged a number of times and is a candidate to be indexed and available to serve queries. For example and in one embodiment, an application state for particular coupon of a coupon application, may be made available to an application state index if this application state has been engaged 50 times. If the number of occurrences is greater than the threshold, process 900 sends a request for the full application state to the device that sent the last application state indication. Process 900 receives the application state at block 910. Process 900 indexes the application state at block 910. By indexing the application state, process 900 is making this application state available to be part of a set of results for a query.

In another embodiment, instead requesting the full application state at the last receipt of the application state indication, process 900 starts to incrementally build the application state until process 900 receives the final piece of the application state and indexes the application state. For example and in one embodiment, process 900 asks the last M clients to send process 900 $1/M^{th}$ of the application state. In this example, because the application state generates the same application state hash, this is the same application state. This means that these M pieces of the application state can be joined by process 900. This embodiment may provide additional privacy because parts of the application state are transmitted each time that allows process 900 to build the complete application state.

Figure 10:
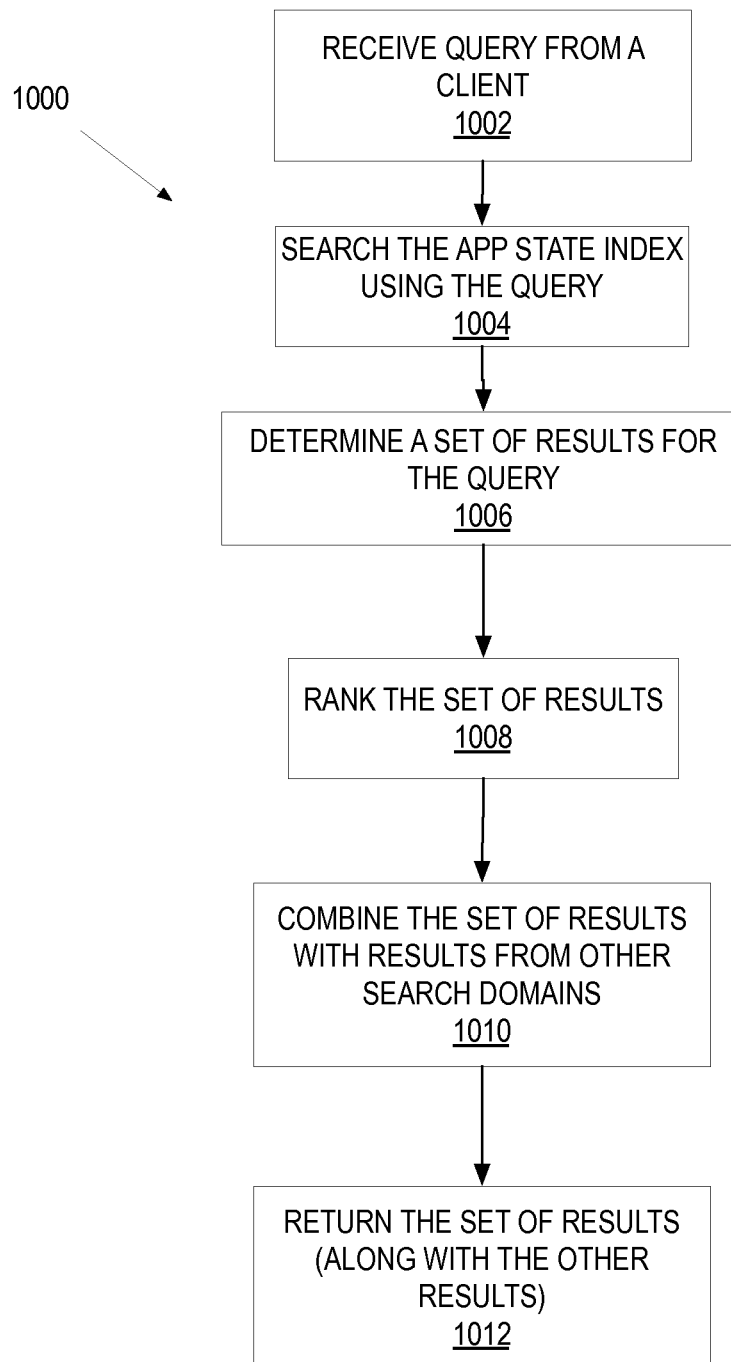
FIG. 10 is a flow chart of one embodiment of a process to perform a query search using an application state index.

FIG. 10 is a flow chart of one embodiment of a process 1000 to perform a query search using an application state index. In one embodiment, process 1000 is performed by a remote application state search service to perform a query search using an application state index, such as the remote application state search service 714 as described above in FIG. 7. In FIG. 10, process 1000 begins by receiving a query from a client at block 1002. In one embodiment, a query is a search string that is input by user in the application and sent to the remote search service as described above. At block 1004, process 1000 searches the application state index using the query. In one embodiment, process 1000 determines if there are any application states that match the query. Process 1000 determines a set of results for the query at block of 1006. In one embodiment, the set of results includes one or more application states that match some or all of the text in the query. At block 1008, process 1000 ranks the set of results. In one embodiment, process 1000 ranks the set of results by determining the score for each of the results and ranking these results using those scores. At block 1010, process 1000 combines a set of results with results from other search domains. In one embodiment, if the search is a federated search, where the same query is used to search different indices, process 1000 combines results from other search domains with the set of results determined using the application state index. For example and in one embodiment, the query may be used to search the application state index, a general web search index, and/or different indices (e.g., media index, application store index, maps index, online encyclopedia index, and/or another type of index). At block 1012, process 1000 returns a set of ranked results, along with the other results generated in block 1010, to the client.

Figure 11:
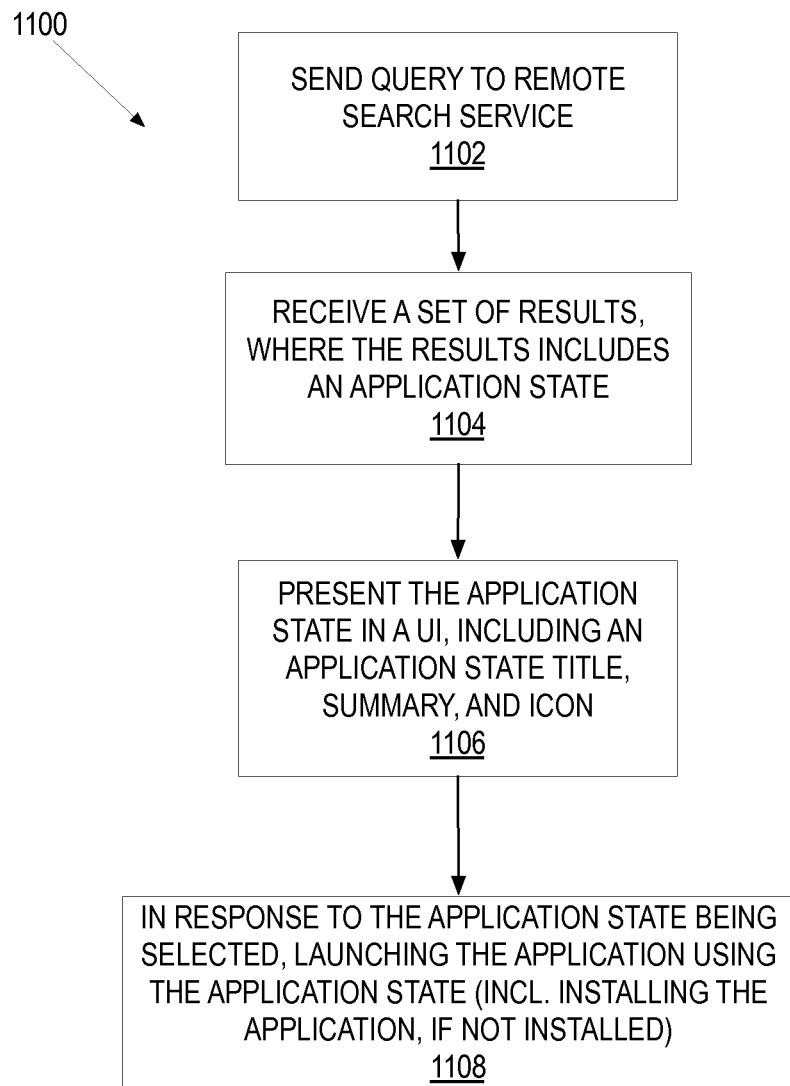
FIG. 11 is a flow diagram of one embodiment of a process to receive and present an application state as part of a query result.

FIG. 11 is a flow diagram of one embodiment of a process 1100 to receive and present an application state as part of a query result. In one embodiment, process 1100 is performed by an application to receive and present an application state as part of the query result, such as application 704 described in FIG. 7 above. In FIG. 11, process 1100 begins by sending a query to a remote search service at block 1102. In one embodiment, the query can be a search string that is input by user in the application and sent to the remote search service. In this embodiment, the input can be entered by text, spoken word, automatically generated, received from a coupled device (e.g., a smart watch coupled to a portable device), and/or some other way to enter a search string. At block 1104, process 1100 receives a set of results, where the results include an application state. In this embodiment, the application state is sanitized application state that has been engaged by a user a requisite number of times as described in FIG. 6 above. In one embodiment, the set of results are ranked with the top-ranked result being a top hit. At block 1106, process 1100 presents the application state in a user interface. In this embodiment, the application state includes an application state title, summary, and an indication of an icon corresponding to the application for this application state. In one embodiment, process 1100 displays the application state as described in FIG. 3 above. In response to the application being selected, process 1100 launches the corresponding application using the selected application state. For example and in one embodiment, if the application state is a review of a local restaurant for a review type application, process 1100 launches the review type application with the local restaurant application state. In this example, the review type application would be launched such that the view presented to the user is the one of the local restaurant in the review type application. In one embodiment, if the application is not installed on the device, process 1100 can download the application from a remote source, such as an application store, webpage, or other remote server. In this embodiment, process 1100 would install the application and launch the application using the selected application state.

Figure 12:
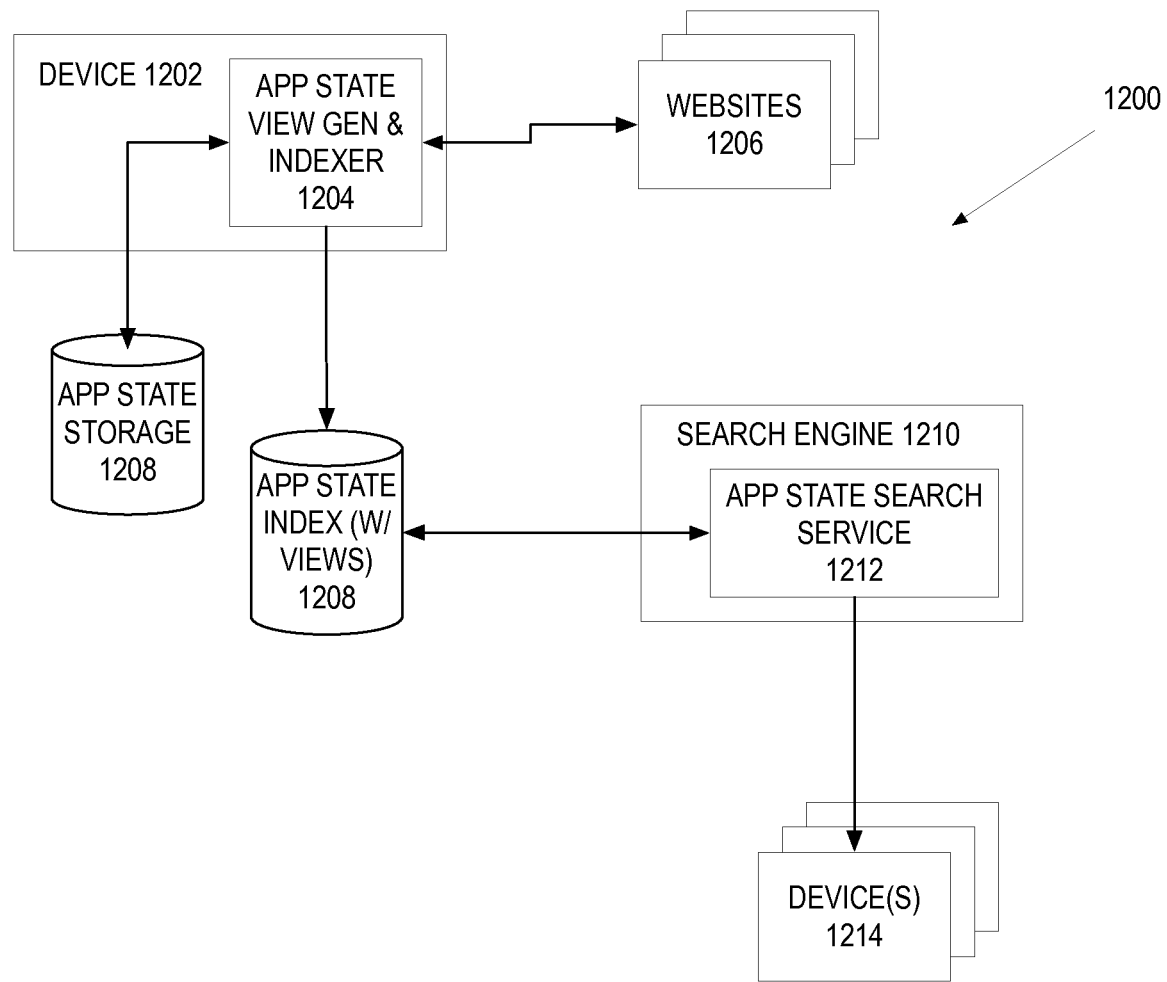
FIG. 12 is a block diagram of one embodiment of a system that indexes application state views for use in a remote search index.

FIG. 12 is a block diagram of one embodiment of a system 1200 that indexes application state views for use in a remote search index. In FIG. 12, device 1202 is coupled to an application state storage 1206 and application state index 1208. In one embodiment, device 1202 retrieves the application states stored in the application state storage 1206, and for each of the application states, the device 1202 generates a view for each of these application states. In one embodiment, the view of an application state is a representation of a user interface of the application corresponding to that application state. For example in one embodiment, a user interface can include text, images, video, audio, animation, graphics, and/or other types of user interface components. In this example, the corresponding view is a two-dimensional representation of the user interface. In one embodiment, one application may have many different views generated based on the different application states that are associated with this application. For example and in one embodiment, a review type application that has access to content for thousands or millions of reviews for businesses and services can have a view for each of the thousands or millions of reviews. A view is further described in FIG. 13 below.

In one embodiment, the application states stored in the application state storage 1206 may be application states that have been engaged by user a requisite number of times as explained above in FIG. 6. Alternatively, the application state storage 1206 may also include unindexed application states. In addition, the application state index 1208 includes indexed application states that have views generated for those application states. In this embodiment, these views can be returned along with the application state as part of a set of results for a query. A search engine 1210 includes an application state search service 1212 that receives queries from the devices 1214. The application states search service 1212 receives queries from the devices 1214, searches the application state index using these queries, determines matching application states for the queries that have associated views, scores the matching application states, ranks the matching application states, and returns these matching application states as a set of results to the device that sent the original query.

Figure 13:
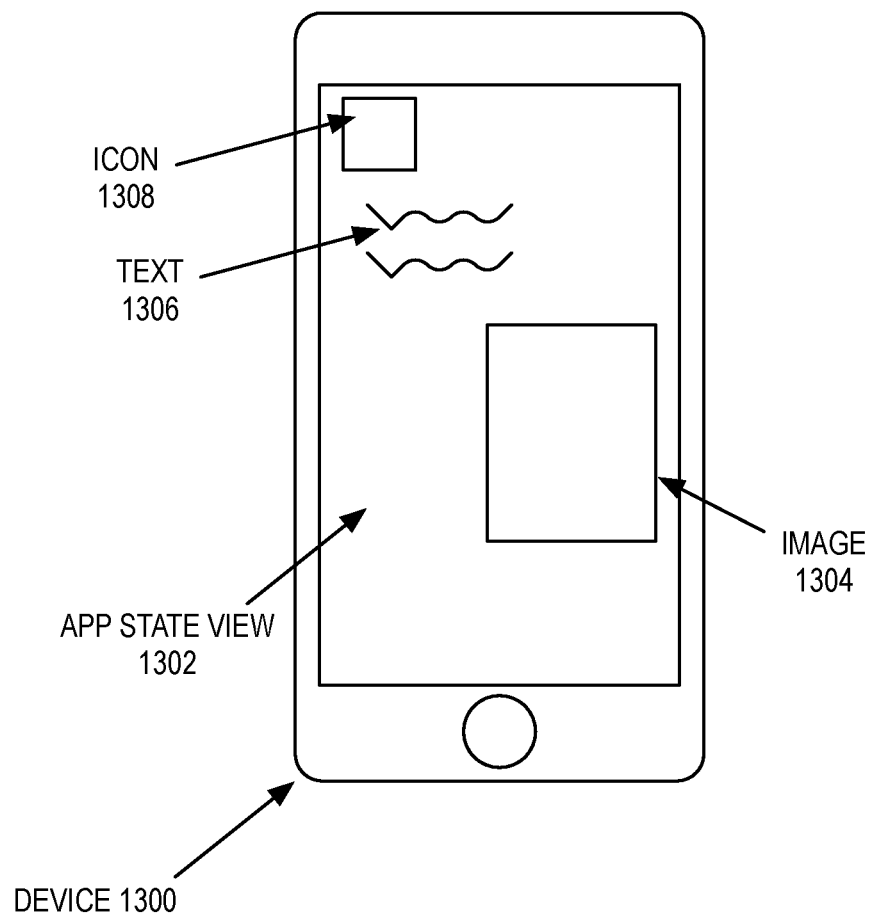
FIG. 13 is a block diagram of one embodiment of an application view.

As described above, an application state can have an associated view. FIG. 13 is a block diagram of one embodiment of an application state view 1302. In FIG. 13, a device 1300 has an application executing that is in a particular application state. The application in this application state displays the application state user interface 1302. The application state user interface 1302 can include a variety of components, such as an icon, text, image, video, audio, animation, graphics, and/or other types of user interface components. For example and in one embodiment, the application state user interface 1302 includes image 1304, text 1306, and icon 1308. In one embodiment, a view can be generated from this application state user interface 1302. In this environment, the view is a representation of the application state user interface 1302 that can be saved and indexed along with this application state in the application state index. For example and in one embodiment, the view for the application state user interface 1302 is a two-dimensional image, such as a GIF, JPEG, PNG, and/or another type of two-dimensional image. In this example, the two-dimensional image of the view can be stored with the application state in the application state index.

Figure 14:
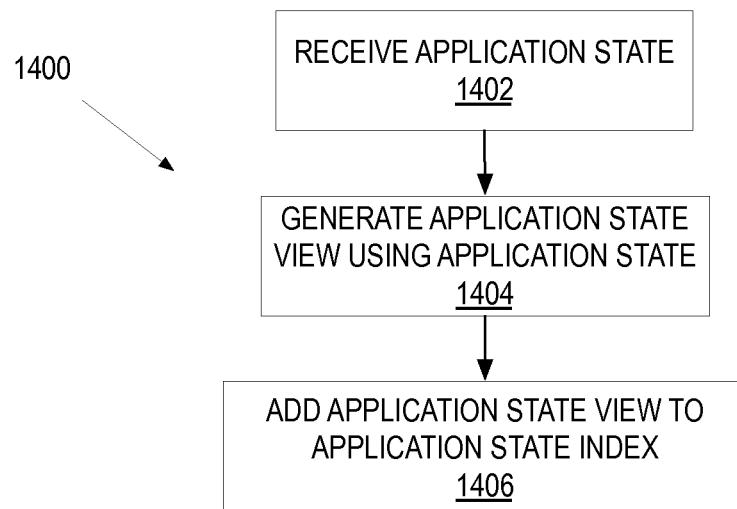
FIG. 14 is a flow chart of one embodiment of a process to generate an application state view using an application state.

FIG. 14 is a flow chart of one embodiment of a process 1400 to generate an application state view using an application state. In one embodiment, process 1400 is performed by an application state view generator and indexer to generate an application state view using an application state, such as the application state view generator and indexer 1204 described in FIG. 12 above. In FIG. 14, process 1400 begins by receiving an application state at block 1402. In one embodiment, process 1400 receives the application state from an application state storage, such as the application state storage 1206 as described in FIG. 12 above. At block 1404, process 1400 generates the application state view using this application state. In one embodiment, process 1400 generates the application state view by simulating the application using that application state. In this embodiment, the application is executed in a simulator with this application state. Process 1400 can capture the application user interface for this application state using a private framework of the simulator. Alternatively, process 1400 could load the application onto a virtual platform or the device itself and use a mechanism to generate a view of that application state. At block 1406, process 1400 adds the application state view to the application state index for the corresponding application state.

By generating these application state views, process 1400 can generate a multitude of views for one or more applications. These views can be used to preview the application state and also the application in general. In one embodiment, these application state views can be used to preview and application state that is returned in a set of results for a query or can be used in general to preview application. Using the view with the query is further described in FIG. 15 below. In one embodiment, collecting a number of application state views for one application can be used to preview that application. For example and in one embodiment, a review type application may have dozens of application state views available for this application. For someone who is interested in this review type application, for example, viewing the application in application store, these application state views can be made available so that the user can preview the application before purchasing and/or downloading the application. In this example, the user may scrub through the dozens of views, forwards and backwards, to get an idea of what the application would look like.

Figure 15:
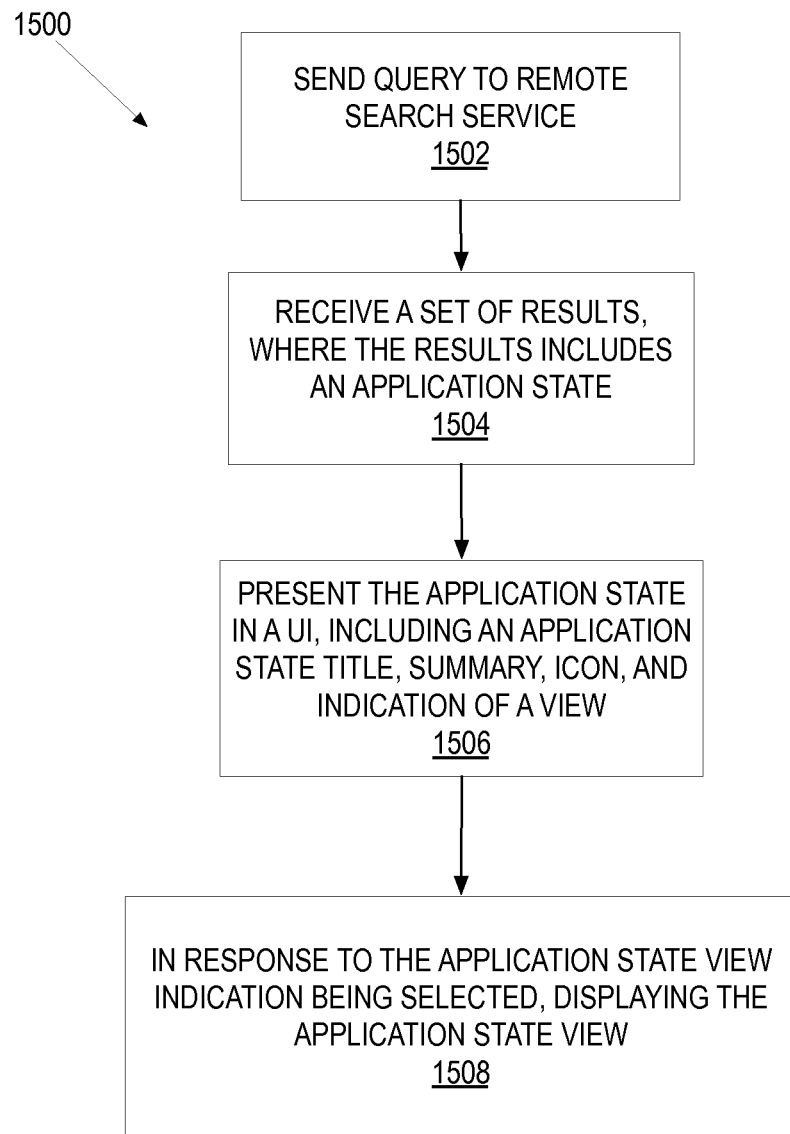
FIG. 15 is a flow chart of one embodiment of a process to receive and present an application state that includes an application state view as part of a query result.

FIG. 15 is a flow chart of one embodiment of a process 1500 to receive and present an application state that includes an application state view as part of a query result. In one embodiment, process 1500 is performed by a device to receive and present an application state view as part of the query result, such as device 1214 described in FIG. 12 above. In FIG. 15, process 1500 begins by sending a query to a remote search service at block 1502. In one embodiment, the query can be a search string that is input by user in the application and sent to the remote search service. In this embodiment, the input can be entered by text, spoken word, automatically generated, received from a coupled device (e.g., a smart watch coupled to a portable device), and/or some other way to enter a search string. At block 1504, process 1500 receives a set of results, where the results include an application state. In this embodiment, the application state is sanitized application state that has been engaged by a user a requisite number of times as described in FIG. 6 above. In one embodiment, the set of results are ranked with the top-ranked result being a top hit. At block 1506, process 1500 presents the application state in a user interface. In this embodiment, the application state includes an application state title, summary, an indication of an icon corresponding to the application for this application state, and an indication of an availability of a corresponding application view. In response to the application state view being selected, process 1500 retrieves and presents the application state view. In one embodiment, by displaying the application state view, a user can get a preview of the application executing in this application state. This can be helpful to the user in deciding whether to select the application state. In another embodiment, preview the view maybe be faster than launching the application with this application state, even if the application is installed on the device. For example and in one embodiment, if the application state view is a review of a local restaurant for a review type application, process 1500 retrieves and displays the application state view.

Figure 16:
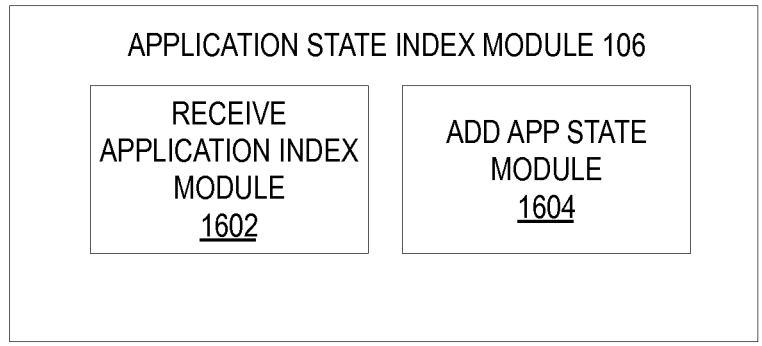
FIG. 16 is a block diagram of one embodiment of an application state index module that indexes application states received from multiple different applications on a device.

FIG. 16 is a block diagram of one embodiment of an application state index module 106 that indexes application states received from multiple different applications on a device. In one embodiment, the application state index module 106 includes a receive application index module 1602 and add application state module 1604. In one embodiment, the receive application index module 1602 receives multiple application states as described in FIG. 4A, block 402 above. The add application state module 1604 adds the application state to the index as described in FIG. 4A, block 404 above.

Figure 17:
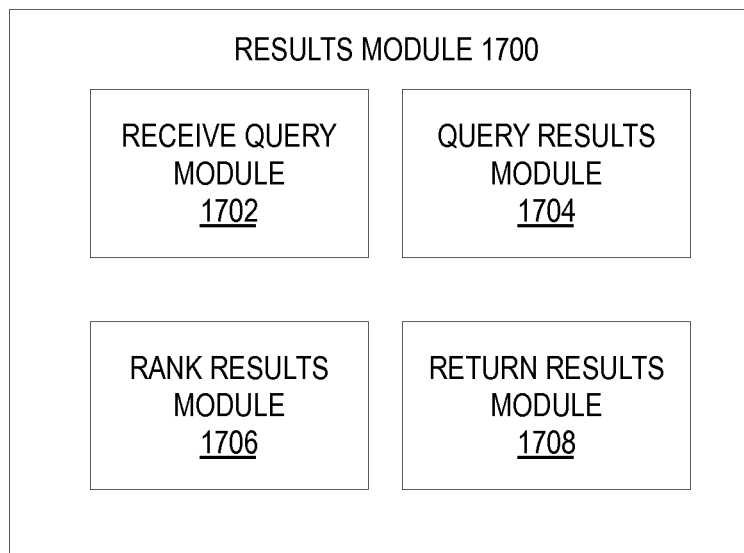
FIG. 17 is a block diagram of one embodiment of a results module that determines query results for a query using an application state index.

FIG. 17 is a block diagram of one embodiment of a results module 1700 that determines query results for a query using an application state index. In one embodiment, the results module 1700 includes a receive query module 1702, query results module 1704, rank results module 1706, and return results module 1708. In one embodiment, the receive query module 1702 receives the query as described in FIG. 4B, block 452 above. The query results module 1704 determines the set of results as described in FIG. 4B, block 454 above. The rank results module 1706 ranks the results as described in FIG. 4B, block 456 above. The return results module 1708 returns the results as described in FIG. 4B, block 458 above.

Figure 18:
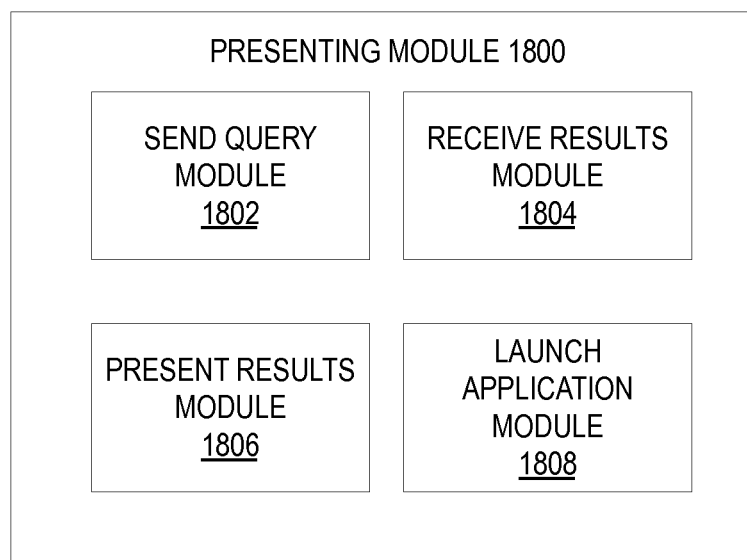
FIG. 18 is a block diagram of one embodiment of a presenting module that receives and presents an application state as part of a query result.

FIG. 18 is a block diagram of one embodiment of a presenting module 1800 that receives and presents an application state as part of a query result. In one embodiment, the presenting module 1800 includes a send query module 1802, receive results module 1804, present results module 1806, and launch application module 1808. In one embodiment, the send query module 1802 sends the query as described in FIG. 5, block 502 above. The receive results module 1804 receive the set of results as described in FIG. 5, block 504 above. The present results module 1806 presents the results as described in FIG. 5, block 506 above. The launch application module 1808 launches the application as described in FIG. 5, block 508 above.

Figure 19:
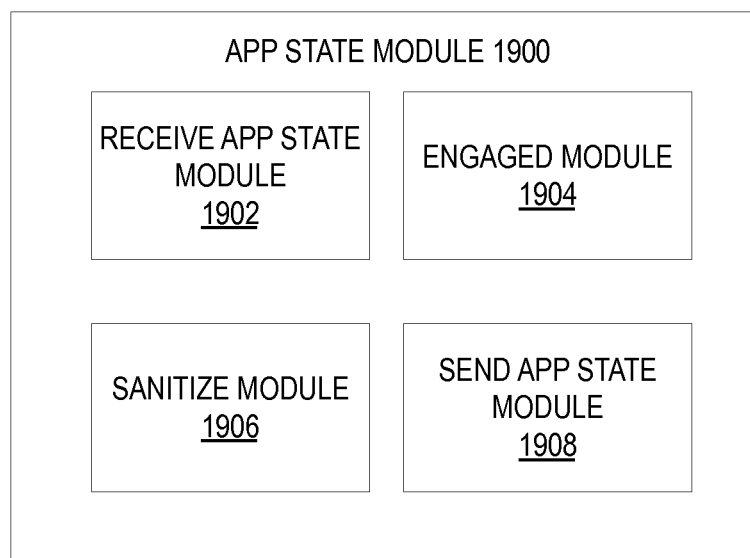
FIG. 19 is a block diagram of one embodiment of an application state module that adds an application state to an application state index.

FIG. 19 is a block diagram of one embodiment of an application state module 1900 that adds an application state to an application state index. In one embodiment, the application state module 1900 includes receive application state module 1902, engaged module 1904, sanitize module 1906, and send application state module 1908. In one embodiment, the receive application state module 1902 receives the application state as described in FIG. 8, block 802 above. The engaged module 1904 determines if the application state has been engaged as described in FIG. 8, block 804 above. The sanitize module 1906 sanitizes the application state as described in FIG. 8, block 806 above. The send application state module 1908 sends the application as described in FIG. 8, block 808 above.

Figure 20:
FIG. 20 is a block diagram of one embodiment of an applications state export module that exports an application state to an application state indexing service.

FIG. 20 is a block diagram of one embodiment of an applications state export module 2000 that exports an application state to an application state indexing service. In one embodiment, the application state export module 2000 includes a receive application state module 2002, increment module 2004, compare module 2006, send application state request module 2008, receive application state module 2010, and index application state module 2012. In one embodiment, the receive application state module 2002 receives an indication of the application state as described in FIG. 9, block 902 above. The increment module 2004 increments the occurrence of the application state as described in FIG. 9, block 904 above. The compare module 2006 compares the number of occurrences as described in FIG. 9, block 906 above. The send application state request module 2008 sends the application state request to the device as described in FIG. 9, block 908 above. The receive application state module 2010 receives the application state as described in FIG. 9, block 910 above. The index application state module 2012 indexes the application state as described in FIG. 9, block 912 above.

Figure 21:
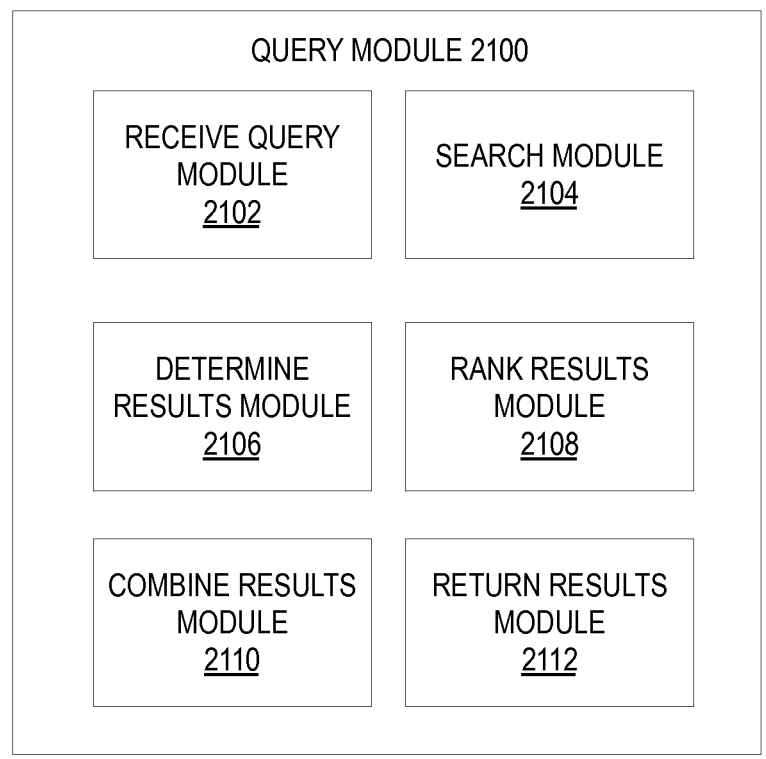
FIG. 21 is a block diagram of one embodiment of a query module that performs a query search using an application state index.

FIG. 21 is a block diagram of one embodiment of a query module 2100 that performs a query search using an application state index. In one embodiment, the query module 2100 includes a receive query module 2102, search module 2104, determine results module 2106, rank results module 2108, combine results module 2110, and return results module 2108. In one embodiment, the receive query module 2102 receives the query as described in FIG. 10, block 1002 above. The search module 2104 searches the index as described in FIG. 10, block 1004 above. The query results module 2106 determines the set of results as described in FIG. 10, block 1006 above. The rank results module 2108 ranks the results as described in FIG. 10, block 1008 above. The combine results module 2110 combines the results form other search domains as described in FIG. 10, block 1010 above. The return results module 2112 returns the results as described in FIG. 10, block 1012 above.

Figure 22:
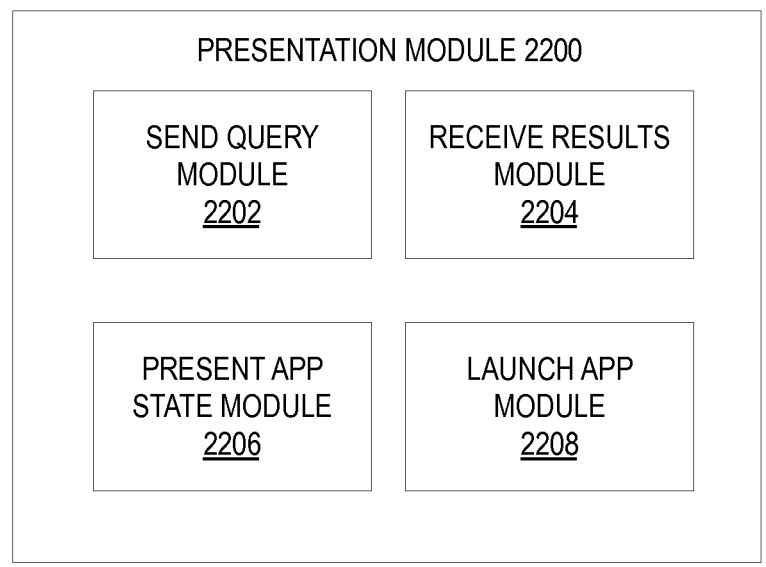
FIG. 22 is a block diagram of one embodiment of another presenting module that receives and presents an application state as part of a query result.

FIG. 22 is a block diagram of one embodiment of another presenting module 2200 that receives and presents an application state as part of a query result. In one embodiment, the presenting module 2200 includes a send query module 2202, receive results module 2204, present results module 2206, and launch application module 2208. In one embodiment, the send query module 2202 sends the query as described in FIG. 11, block 1102 above. The receive results module 2204 receive the set of results as described in FIG. 11, block 1104 above. The present results module 2206 presents the results as described in FIG. 11, block 1106 above. The launch application module 2208 launches the application as described in FIG. 11, block 1108 above.

Figure 23:
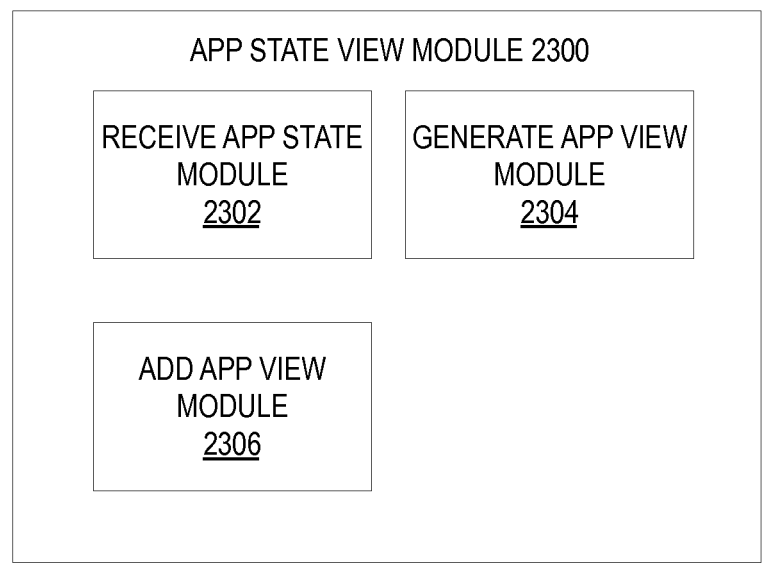
FIG. 23 is a block diagram of one embodiment of an application state view module that generates an application state view using an application state.

FIG. 23 is a block diagram of one embodiment of an application state view module 2300 that generates an application state view using an application state. In one embodiment, the application state view module 2300 includes a receive application state module 2302, generate application view module 2304, and add application view module 2306. The receive application state module 2302 receive the application state as described in FIG. 14, block 1402 above. The generate application view module 2304 generates the application state view as described in FIG. 14, block 1404 above. The add application view module 2306 adds the application view to the index as described in FIG. 14, block 1406 above.

Figure 24:
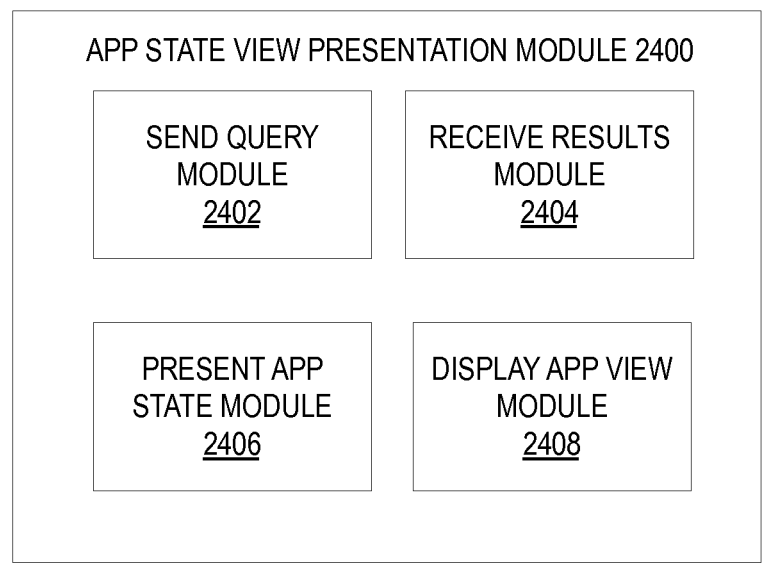
FIG. 24 is a block diagram of one embodiment of an application state view presentation module that receives and presents an application state that includes an application state view as part of a query result.

FIG. 24 is a block diagram of one embodiment of an application state view presentation module 2400 that receives and presents an application state that includes an application state view as part of a query result. In one embodiment, the application state view presenting module 2400 includes a send query module 2402, receive results module 2404, present results module 2406, and display application view module 2408. In one embodiment, the send query module 2402 sends the query as described in FIG. 15, block 1502 above. The receive results module 2404 receive the set of results as described in FIG. 15, block 1504 above. The present application state module 2406 presents the application state as described in FIG. 15, block 1506 above. The display application view module 2408 displays the application view as described in FIG. 15, block 1508 above.

Embodiments described above have illustrated a first device receiving a query input, sending the query, receiving query results, and launching an application on the device. In alternate embodiments, the first device (e.g., a smartphone or another type of portable device) is coupled to a second portable device (e.g., a wearable device such as a smart watch or another type of wearable or portable device) through a personal area network, such as Bluetooth. In these embodiments, the second portable device can perform any of the above actions with regards to the fulfilling of the query search. For example and in one embodiment, the second portable device can receive the inputted query from a user by a variety of means (e.g., input text, gestures, voice, and/or another type of input), where the first device sends the query to the search service. Alternatively, the second device could display the query results, where the first device receives the query results and relays these results to the second device. In a further embodiment, a display and selection of a result can launch an application on the second device. If the application is not installed on the second device, this application can be downloaded and installed on the second prior to the application launch. For example and in one embodiment, a result can be displayed on either the first or second device and, upon selection of this result, an application is launched on the second device. Alternatively, the result can be displayed on the second device and launched on the first device.

As a further example and embodiment, a smartwatch is coupled to a smartphone via a Bluetooth connection. In this embodiment, either the smartphone or smartwatch receives a query input by a user. If the query is received on the smartwatch, the query is sent to the smartphone. The smartphone sends the query to the search service, which can be a local or remote search service. The smartphone receives the search results, where the results can be displayed on the smartphone, smartwatch, and/or a combination thereof. Upon selection of one of the results on either of the smartwatch or the smartphone, an application can be launched on the smartphone, smartwatch, and/or a combination thereof. If the application is not installed on the relevant device, the application can be downloaded and installed on that device prior to being launched.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, users can select to not provide precise location information, but permit the transfer of location zone information.

Figure 25:
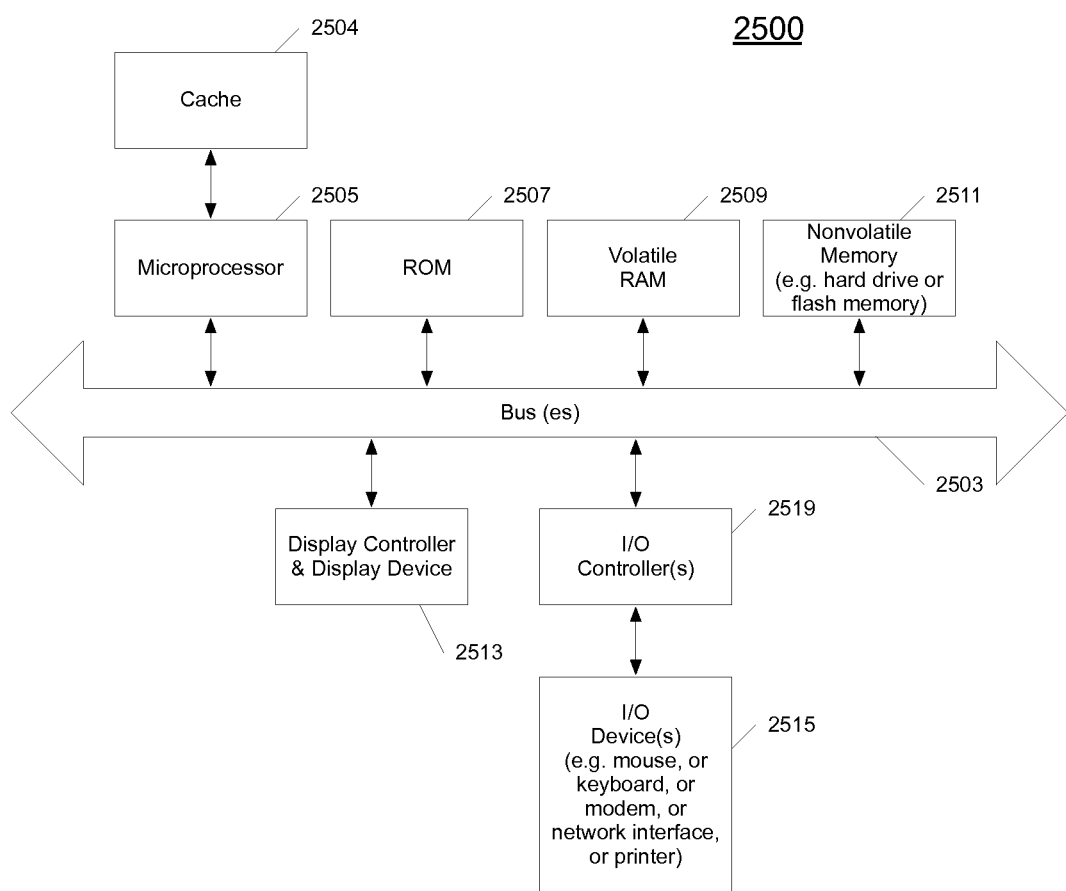
FIG. 25 illustrates one example of a typical computer system, which may be used in conjunction with the embodiments described herein.

FIG. 25 shows one example of a data processing system 2500, which may be used with one embodiment of the present invention. For example, the system 2500 may be implemented including a device 100 as shown in FIG. 1. Note that while FIG. 25 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 25, the computer system 2500, which is a form of a data processing system, includes a bus 2503 which is coupled to a microprocessor(s) 2505 and a ROM (Read Only Memory) 2507 and volatile RAM 2509 and a non-volatile memory 2511. The microprocessor 2505 may include one or more CPU(s), GPU(s), a specialized processor, and/or a combination thereof. The microprocessor 2505 may retrieve the instructions from the memories 2507, 2509, 2511 and execute the instructions to perform operations described above. The bus 2503 interconnects these various components together and also interconnects these components 2505, 2507, 2509, and 2511 to a display controller and display device 2513 and to peripheral devices such as input/output (I/O) devices which may be mice, keyboards, modems, network interfaces, printers and other devices which are well known in the art. Typically, the input/output devices 2515 are coupled to the system through input/output controllers 2513. The volatile RAM (Random Access Memory) 2509 is typically implemented as dynamic RAM (DRAM), which requires power continually in order to refresh or maintain the data in the memory.

The mass storage 2511 is typically a magnetic hard drive or a magnetic optical drive or an optical drive or a DVD RAM or a flash memory or other types of memory systems, which maintain data (e.g. large amounts of data) even after power is removed from the system. Typically, the mass storage 2511 will also be a random access memory although this is not required. While FIG. 25 shows that the mass storage 2511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 2503 may include one or more buses connected to each other through various bridges, controllers and/or adapters as is well known in the art.

Figure 26:
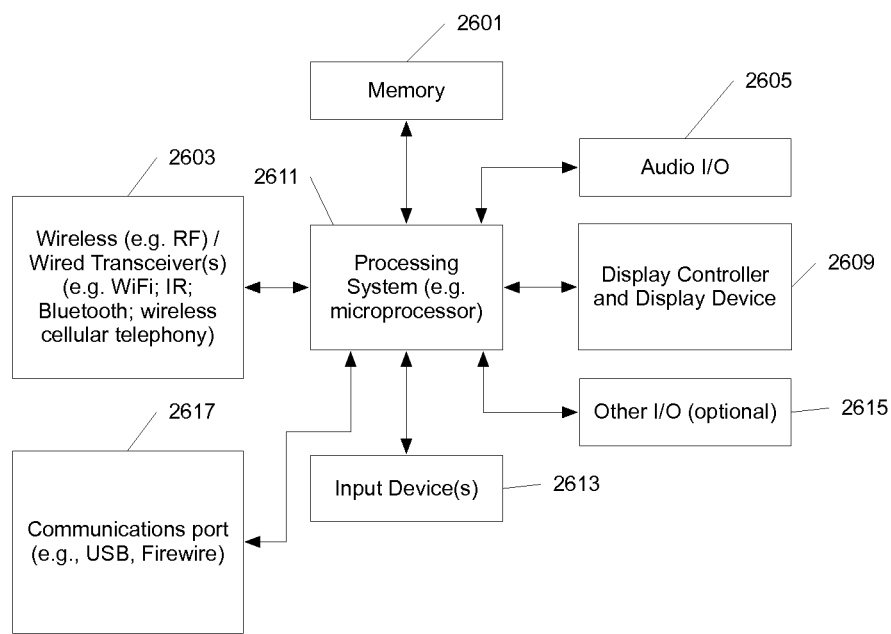
FIG. 26 shows an example of a data processing system, which may be used with one embodiment of the present invention.

FIG. 26 shows an example of another data processing system 2600 which may be used with one embodiment of the present invention. For example, system 2600 may be implemented as a device 100 as shown in FIG. 1. The data processing system 2600 shown in FIG. 26 includes a processing system 2611, which may be one or more microprocessors, or which may be a system on a chip integrated circuit, and the system also includes memory 2601 for storing data and programs for execution by the processing system. The system 2600 also includes an audio input/output subsystem 2605, which may include a microphone and a speaker for, for example, playing back music or providing telephone functionality through the speaker and microphone.

A display controller and display device 2609 provide a visual user interface for the user; this digital interface may include a graphical user interface which is similar to that shown on a Macintosh computer when running OS X operating system software, or Apple iPhone or Apple Watch when running the iOS operating system, etc. The system 2600 also includes one or more wireless transceivers 2603 to communicate with another data processing system, such as the system 2600 of FIG. 26. A wireless transceiver may be a WLAN transceiver, an infrared transceiver, a Bluetooth transceiver, and/or a wireless cellular telephony transceiver. It will be appreciated that additional components, not shown, may also be part of the system 2600 in certain embodiments, and in certain embodiments fewer components than shown in FIG. 26 may also be used in a data processing system. The system 2600 further includes one or more communications ports 2617 to communicate with another data processing system, such as the system 1500 of FIG. 15. The communications port may be a USB port, Firewire port, Bluetooth interface, etc.

The data processing system 2600 also includes one or more input devices 2613, which are provided to allow a user to provide input to the system. These input devices may be a keypad or a keyboard or a touch panel or a multi touch panel. The data processing system 2600 also includes an optional input/output device 2615 which may be a connector for a dock. It will be appreciated that one or more buses, not shown, may be used to interconnect the various components as is well known in the art. The data processing system shown in FIG. 26 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 2600 may be a network computer or an embedded processing device within another device, or other types of data processing systems, which have fewer components or perhaps more components than that shown in FIG. 26.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,310,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "ranking," "receiving," "determining," "searching," "transmitting," "modifying," "performing," "filtering," "adding," "creating," presenting," "detecting," "indexing," "generating," "linking," "simulating," "capturing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to perform a search using a plurality of application states, the method comprising:
    receiving a plurality of application states from an application running on a device;
    creating an application state index including the plurality of application states and a local search index of metadata of other types of objects stored on the device, wherein the application state index and local search index are stored on the device;
    receiving a query to search the application state and local search indices stored on the device;
    searching the plurality of application states using the application state and local search indices and the query;
    determining a match for the query of one of the plurality of the application states;
    returning the match for the matching application state;
    tracking that the one of the plurality of application states has been engaged by a user of the device; and
    in response to the tracking that the one of the plurality of application states has been engaged by a user of the device, exporting the one of the plurality of application states to a remote application state index server, wherein the remote application state index server indexes the one of the plurality of application states and the remote application state index server handles one or more queries from a plurality of devices that did not generate the one of the plurality of application states.

2. The non-transitory machine-readable medium of claim 1, wherein each of the plurality of application states includes data representing a snapshot in time of an application for that application state.

3. The non-transitory machine-readable medium of claim 2, wherein there are multiple application states for one of the plurality of applications.

4. The non-transitory machine-readable medium of claim 1, wherein the query is used to search files stored on the device in addition to the searching of the plurality of application states.

5. The non-transitory machine-readable medium of claim 1, wherein one of the plurality of application states includes user interface state information that represents a view position of user interface data used by the corresponding one of the plurality of applications.

6. The non-transitory machine-readable medium of claim 1, wherein each of the plurality of application states includes searchable data.

7. The non-transitory machine-readable medium of claim 1, wherein each of the plurality of application states includes application-specific opaque data.

8. The non-transitory machine-readable medium of claim 1, wherein an engaged application state is an application state has been returned as a query result in response to a query by the user on the device and that user has selected that application state.

9. The non-transitory machine-readable medium of claim 1, wherein the exporting comprises:
sanitizing the one of the plurality of application states; and
sending the one of the plurality of application states to the remote application state index server.

10. The non-transitory machine-readable medium of claim 9, wherein the sanitizing comprises:
removing private information from the one of the plurality of application states.

11. A non-transitory machine-readable medium having executable instructions to cause one or more processing units to perform a method to perform a query using a plurality of application states, the method comprising:
performing the query on a device using an index stored on the device;
receiving a plurality of results matching the query;
determining a first subset of the plurality of results that correspond to an application state corresponding to a native application installed on the device and a second subset of the plurality of results that correspond to other search results;
presenting, for each of the results in the first subset of the plurality of results in a user interface, that result and a representation of the native application corresponding to the result, and, for each of the results in the second subset of the plurality of results in the user interface of the device;
tracking that one of first subset of the plurality of results has been engaged by a user of the device; and
in response to the tracking that one of first subset of the plurality of results has been engaged by a user of the device, exporting the one of first subset of the plurality of results to a remote application state index server, wherein the remote application state index server indexes the one of the plurality of application states and the remote application state index server handles one or more queries from a plurality of devices that did not generate the one of first subset of the plurality of results.

12. The non-transitory machine-readable medium of claim 11, an application state includes data representing a snapshot in time of the native application for that application state.

13. The non-transitory machine-readable medium of claim 12, wherein there are multiple application states stored in the index for the native application.

14. The non-transitory machine-readable medium of claim 11, the application state includes user interface state information that represents a view position of user interface data used by the native application.

15. The non-transitory machine-readable medium of claim 11, wherein the application state includes searchable data.

16. A device to perform a search using a plurality of application states, the device comprising:
a processor;
a memory coupled to the processor though a bus; and
a process executed from the memory by the processor causes the processor to receive the plurality of application states from an application running on a device, create an index including the plurality of application states, the index stored on the device, receive a query to search the application state and local search indices stored on the device, search the plurality of application states using the index and the query, determine a match for the query of one of the plurality of the application states, return the match for the matching application state, tracking that the one of the plurality of application states has been engaged by a user of the device; and in response to the tracking that the one of the plurality of application state has been engaged by a user of the device, export the one of the plurality of application states to a remote application state indexer, wherein the remote application state index server indexes the one of the plurality of application states and the remote application state index server handles one or more queries from a plurality of devices that did not generate the one of the plurality of application states.

17. A method to perform a search using a plurality of application states, the method comprising:
receiving a plurality of application states from an application running on a device;
creating an index including the plurality of application states, the index stored on the device;
receiving a query to search for data stored on the device;
searching the plurality of application states using the index and the query;
determining a match for the query of one of the plurality of the application states;
returning the match for the matching application state;
tracking that the one of the plurality of application states has been engaged by a user of the device; and
in response to the tracking, exporting the one of the plurality of application states to a remote application state index server, wherein the remote application state index server indexes the one of the plurality of application state and the remote application state index server handles one or more queries from a plurality of devices that did not generate the one of the plurality of application states.

18. The method of claim 17, wherein each of the plurality of application states includes data representing a snapshot in time of an application for that application state.

19. The method of claim 17, wherein there are multiple application states for one of the plurality of applications.

20. The method of claim 17, wherein the query is used to search files stored on the device in addition to the searching of the plurality of application states.

21. The method of claim 17, wherein one of the plurality of application states includes user interface state information that represents a view position of user interface data used by the corresponding one of the plurality of applications.

22. A method to perform a query using a plurality of application states, the method comprising:
performing the query on a device using an index stored on the device;
receiving a plurality of results matching the query;
determining a subset of the plurality of results that correspond to an application state corresponding to a native application installed on the device;
presenting, for each of the results in the subset of the plurality of results, that result and a representation of the native application corresponding to the result;
tracking that one of first subset of the plurality of results has been engaged by a user of the device; and
in response to the tracking that one of first subset of the plurality of results has been engaged by a user of the device, exporting the one of first subset of the plurality of results to a remote application state index server, wherein the remote application state index server indexes the one of first subset of the plurality of results and the remote application state index server handles one or more queries from one or more devices that did not generate the one of first subset of the plurality of results.

23. A machine-readable medium having executable instructions to cause one or more processing units to perform a method to perform a search using a plurality of application states, the method comprising:
receiving a plurality of application states from an application running on a device;
creating an application state index including the plurality of application states and a local search index of metadata of other types of objects stored on the device, wherein the application state index and local search index are stored on the device;
receiving a query to search the application state and local search indices stored on the device;
searching the plurality of application states using the application state and local search indices and the query;
determining a match for the query of one of the plurality of the application states;
returning the match for the matching application state;
tracking that the one of the plurality of application states has been engaged by a user of the device; and
in response to the tracking that the one of the plurality of application states has been engaged by a user of the device, exporting the one of the plurality of application states to a remote application state index server, wherein the remote application state index server indexes the one of the plurality of application states and the remote application state index server handles one or more queries from a plurality of devices that did not generate the one of the plurality of application states and the exporting comprises,
sanitizing the one of the plurality of application states by removing private information from the one of the plurality of application states, and
sending the one of the plurality of application states to the remote application state index server.

\* \* \* \* \*